United States Patent
Chen et al.

(10) Patent No.: US 12,492,169 B2
(45) Date of Patent: Dec. 9, 2025

(54) AMINOPYRIDINE COMPOUND AND APPLICATION THEREOF

(71) Applicant: CISEN PHARMACEUTICAL CO., LTD., Shandong (CN)

(72) Inventors: Shuhui Chen, Shanghai (CN); Xiaoping Zheng, Shanghai (CN); Zhigan Jiang, Shanghai (CN); Haiying He, Shanghai (CN)

(73) Assignee: CISEN PHARMACEUTICAL CO., LTD., Shandong (CN)

( * ) Notice: Subject to any disclaimer, the term of this patent is extended or adjusted under 35 U.S.C. 154(b) by 397 days.

(21) Appl. No.: 18/255,584

(22) PCT Filed: Dec. 14, 2021

(86) PCT No.: PCT/CN2021/137888
§ 371 (c)(1),
(2) Date: Jun. 1, 2023

(87) PCT Pub. No.: WO2022/127782
PCT Pub. Date: Jun. 23, 2022

(65) Prior Publication Data
US 2023/0416204 A1    Dec. 28, 2023

(30) Foreign Application Priority Data

Dec. 15, 2020 (CN) .......... 202011482610.1
May 14, 2021 (CN) .......... 202110528944.6

(51) Int. Cl.
*C07D 213/73* (2006.01)
*A61P 31/10* (2006.01)
*C07F 9/6558* (2006.01)

(52) U.S. Cl.
CPC ........... *C07D 213/73* (2013.01); *A61P 31/10* (2018.01); *C07F 9/65583* (2013.01)

(58) Field of Classification Search
CPC ..... C07D 213/73; A61P 31/10; C07F 9/65583
See application file for complete search history.

(56) References Cited

U.S. PATENT DOCUMENTS

| 2009/0082403 A1 | 3/2009 | Tanaka |
| 2010/0099718 A1* | 4/2010 | Matsukura ........... C07D 413/04 514/342 |

FOREIGN PATENT DOCUMENTS

| CN | 101300250 A | 11/2008 |
| CN | 101668767 A | 3/2010 |
| CN | 102796139 A | 11/2012 |
| WO | 2007052615 A1 | 5/2007 |
| WO | 2008035726 A1 | 3/2008 |
| WO | 2008136324 A1 | 11/2008 |
| WO | 2020247804 A1 | 12/2020 |

OTHER PUBLICATIONS

Mar. 11, 2022 International Search Report issued in International Patent Application No. PCT/CN2021/137888.
Mar. 25, 2022 Written Opinion of the International Searching Authority issued in International Patent Application No. PCT/CN2021/137888.
CAS RN=2549906-43-4 , Dec. 8, 2020.
CAS RN=2573524-32-8, RN=2571717-16-1, Jan. 1, 2021.
English Translation of Priority Document CN202011482610.1.
English Translation of Priority Document CN202110528944.6.
May 21, 2024 Japanese Office Action issued in Japanese Patent Application No. 2023-534396.
Oct. 31, 2024 Extended European Search Report issued in European Patent Application No. 21905711.4.
Mar. 26, 2025 Chinese First Office Action issued in Chinese Patent Application No. 2021800840271.
Mar. 26, 2025 Chinese Search Report issued in Chinese Patent Application No. 2021800840271.

* cited by examiner

*Primary Examiner* — Timothy R Rozof
(74) *Attorney, Agent, or Firm* — Houston Beshining Law Office PLLC; Liangang Ye

(57) ABSTRACT

An aminopyridine compound, which is specifically a compound represented by formula (P), and a pharmaceutically acceptable salt thereof. The compound can be used to prepare drugs for treating deep fungal infections.

16 Claims, No Drawings

AMINOPYRIDINE COMPOUND AND APPLICATION THEREOF

The present application is a National Stage of International Application No. PCT/CN2021/137888, filed on Dec. 14, 2021, which claims priorities of the Chinese Patent Application No. CN202011482610.1 filed on Dec. 15, 2020 and the Chinese Patent Application NO. CN202110528944.6 filed on May 14, 2021.

TECHNICAL FIELD

The present disclosure relates to a series of aminopyridyl compounds, specifically to a compound of formula (P) and a pharmaceutically acceptable salt thereof.

BACKGROUND

Invasive fungal disease (IFD) is the deadliest type of fungal infection, with a rapid increase in both incidence and mortality rates. The fungal cell wall is mainly composed of glucan, chitin, and mannoprotein. Glycosylphosphatidylinositol-anchored proteins (GPI-APs) anchor on the cell membrane and cell wall, mediating cross-linking between mannoprotein and glucan, which has an important impact on the synthesis, adhesion, and morphological transformation of the fungal cell wall. Where Gwt1 is a key histone acetyltransferase in the GPI synthesis process with an important role in the formation of GPI precursors. Inhibition of Gwt1 activity leads to obstruction of GPI-AP synthesis. Mannoproteins on the surface of fungi cannot be cross-linked to the cell wall, thereby destroying their ability to adhere to the host surface and the integrity of the cell wall, exerting an antifungal effect.

CONTENT OF THE PRESENT INVENTION

The present disclosure provides a compound of formula (P) or a pharmaceutically acceptable salt thereof,

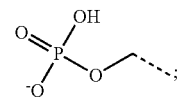

(P)

wherein,
ring A is selected from

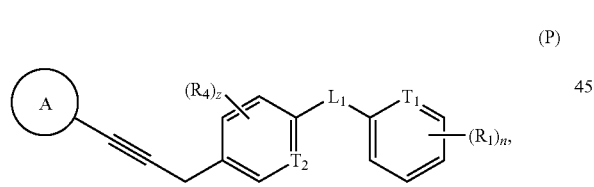

$T_1$ and $T_2$ are selected from CH and N;
$L_1$ is selected from —O—, —CH$_2$O—, and —OCH$_2$—, and the —CH$_2$O— and —OCH$_2$ are optionally substituted by 1 or 2 halogens;
each $R_1$ is independently selected from H, F, Cl, Br, I, OH, and NH$_2$;
each $R_2$ is independently selected from F, Cl, OH, NH$_2$, and $C_{1-3}$ alkyl, and the $C_{1-3}$ alkyl is optionally substituted by 1, 2, or 3 $R_a$;
$R_3$ is selected from

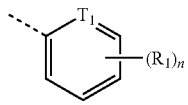

each $R_4$ is independently selected from H, F, Cl, Br, and I;
each $R_a$ is independently selected from F, Cl, Br, and I;
m is selected from 1, 2, 3, and 4;
n is selected from 1, 2, 3, and 4;
z is selected from 1, 2, and 3.

In some embodiments of the present disclosure, the $L_1$ is selected from —O—, —CH$_2$O—, and —OCH$_2$—, and other variables are as defined in the present disclosure.

In some embodiments of the present disclosure, the $T_1$ is selected from N, and other variables are as defined in the present disclosure.

In some embodiments of the present disclosure, the $T_2$ is selected from CH, and other variables are as defined in the present disclosure.

In some embodiments of the present disclosure, each $R_1$ is independently selected from H and F, and other variables are as defined in the present disclosure.

In some embodiments of the present disclosure, the structural moiety

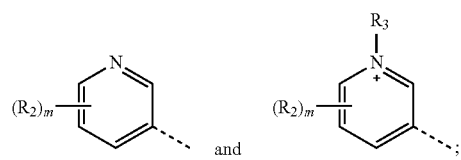

is selected from

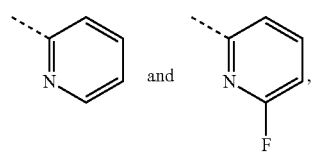

and other variables are as defined in the present disclosure.

In some embodiments of the present disclosure, each $R_2$ is independently selected from F, Cl, OH, NH$_2$, CH$_3$, CH$_2$CH$_3$, and CH(CH$_3$)$_2$, and the CH$_3$, CH$_2$CH$_3$, and CH(CH$_3$)$_2$ are optionally substituted by 1, 2, or 3 $R_a$, and other variables are as defined in the present disclosure.

In some embodiments of the present disclosure, each $R_2$ is independently selected from F, Cl, OH, NH$_2$, CH$_3$, CHF$_2$, and CH$_2$F, and other variables are as defined in the present disclosure.

In some embodiments of the present disclosure, the structural moiety

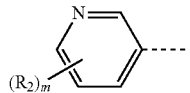

is selected from

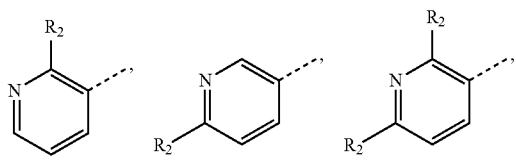

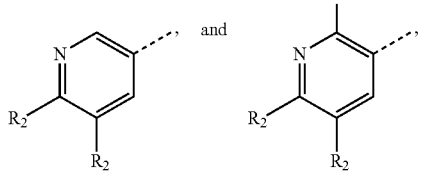

and other variables are as defined in the present disclosure.

In some embodiments of the present disclosure, the structural moiety

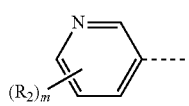

is selected from

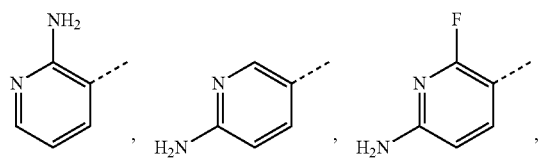

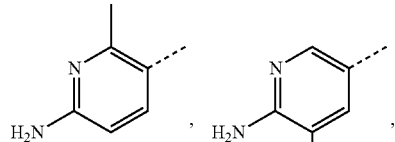

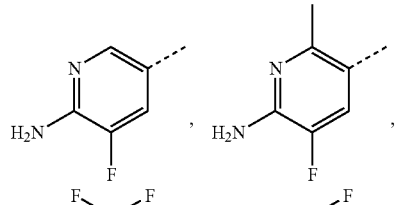

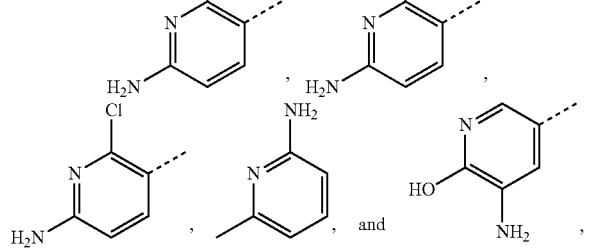

and other variables are as defined in the present disclosure.

In some embodiments of the present disclosure, the structural moiety

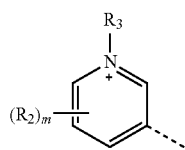

is selected from

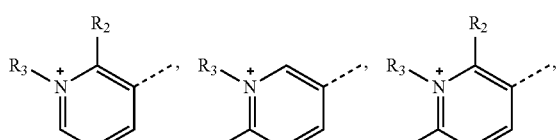

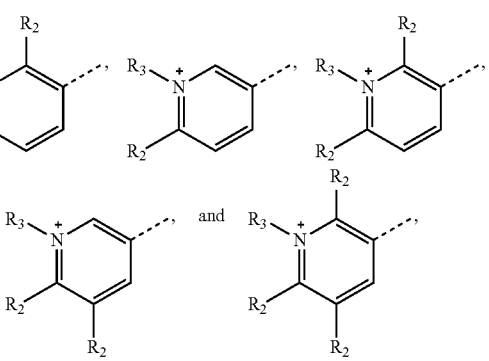

and other variables are as defined in the present disclosure.

In some embodiments of the present disclosure, the structural moiety

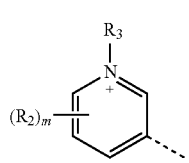

is selected from

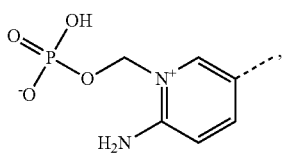

and other variables are as defined in the present disclosure.

In some embodiments of the present disclosure, the ring A is selected from

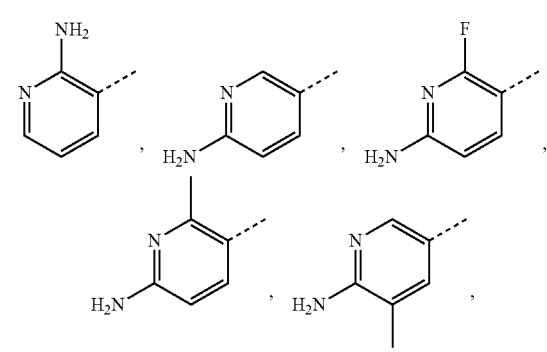

-continued

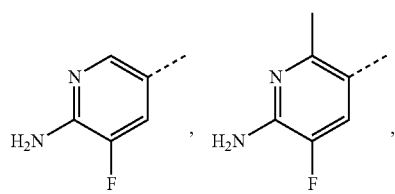

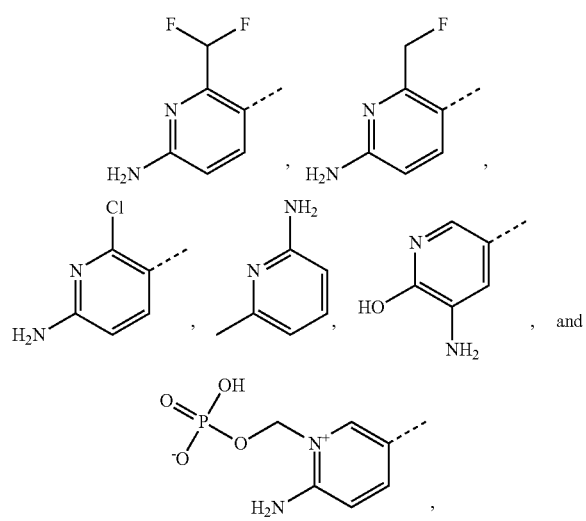

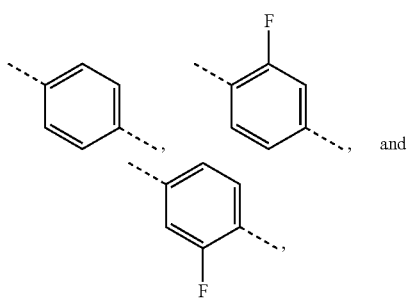

and other variables are as defined in the present disclosure.

In some embodiments of the present disclosure, the compound or the pharmaceutically acceptable salt thereof is selected from:

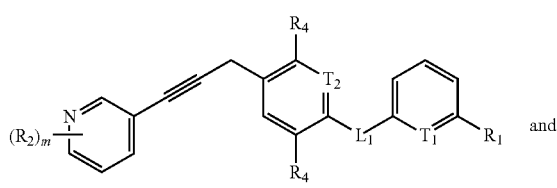

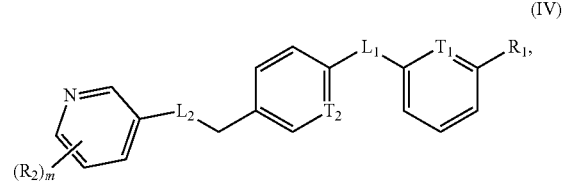

wherein, $L_1$, $T_1$, $T_2$, $R_1$, $R_2$, $R_4$, and m are as defined in the present disclosure.

The present disclosure provides a compound of formula (IV) or a pharmaceutically acceptable salt thereof,

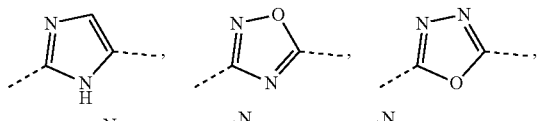

wherein, $L_2$ is selected from

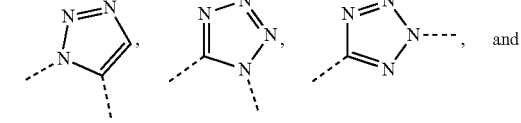

$T_1$ and $T_2$ are selected from CH and N;

$L_1$ is selected from —O—, —CH$_2$O—, and —OCH$_2$—;

$R_1$ is selected from H, F, Cl, Br, I, OH, and NH$_2$;

each $R_2$ is independently selected from F, Cl, OH, NH$_2$, and $C_{1-3}$ alkyl, and the $C_{1-3}$ alkyl is optionally substituted by 1, 2, or 3 $R_a$;

each $R_a$ is independently selected from F, Cl, Br, and I;

m is selected from 1, 2, 3, and 4;

In some embodiments of the present disclosure, each $R_4$ is independently selected from H and F, and other variables are as defined in the present disclosure.

In some embodiments of the present disclosure, the structural moiety

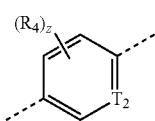

is selected from wherein formula (III) does not comprise molecules

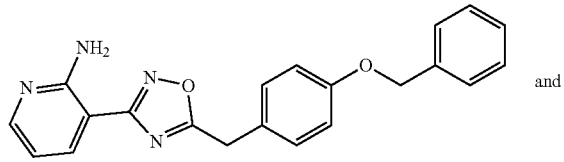

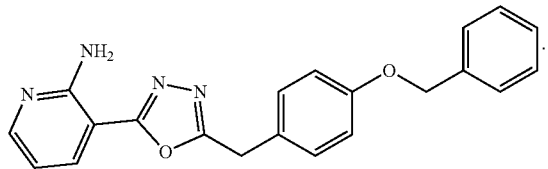

and

In some embodiments of the present disclosure, the structural moiety

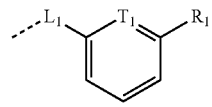

is selected from

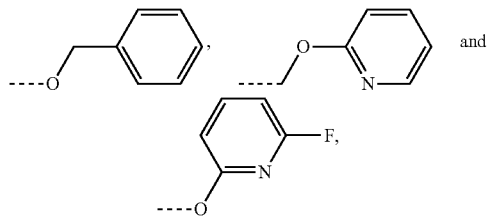

and other variables are as defined in the present disclosure.

In some embodiments of the present disclosure, each $R_2$ is independently selected from F, Cl, OH, $NH_2$, $CH_3$, $CH_2CH_3$, and $CH(CH_3)_2$, and the $CH_3$, $CH_2CH_3$, and $CH(CH_3)_2$ are optionally substituted by 1, 2, or 3 $R_a$, and other variables are as defined in the present disclosure.

In some embodiments of the present disclosure, each $R_2$ is independently selected from F, $NH_2$, $CH_3$, $CHF_2$, and $CH_2F$, and other variables are as defined in the present disclosure.

In some embodiments of the present disclosure, the structural moiety

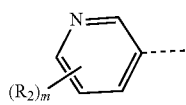

is selected from

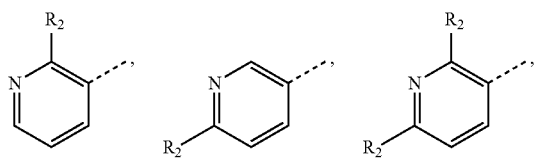

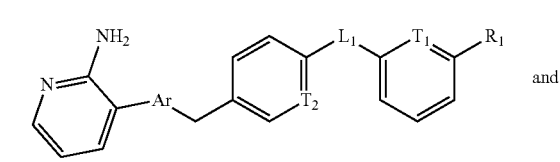

and other variables are as defined in the present disclosure.

In some embodiments of the present disclosure, the structural moiety

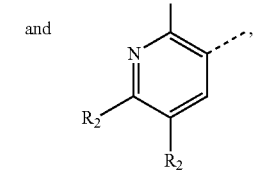

is selected from

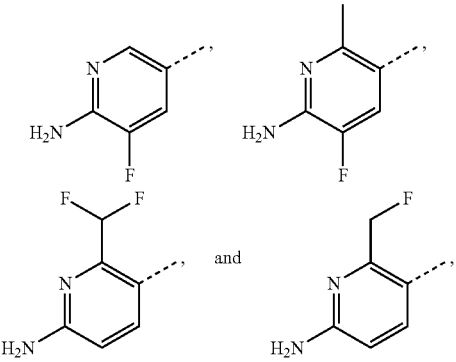

and other variables are as defined in the present disclosure.

In some embodiments of the present disclosure, the compound or the pharmaceutically acceptable salt thereof is selected from:

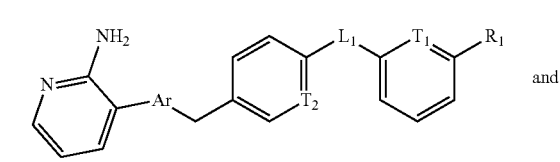

(I)

and (IV-1)

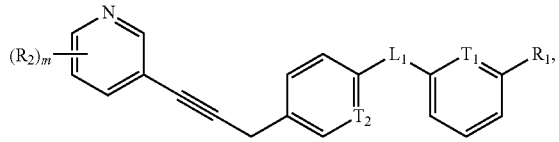

wherein,
Ar is selected from

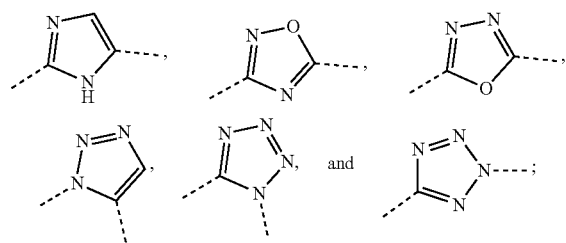

$L_1$, $T_1$, $T_2$, $R_1$, $R_2$, and m are as defined in the present disclosure;

and formula (I) does not comprise molecules

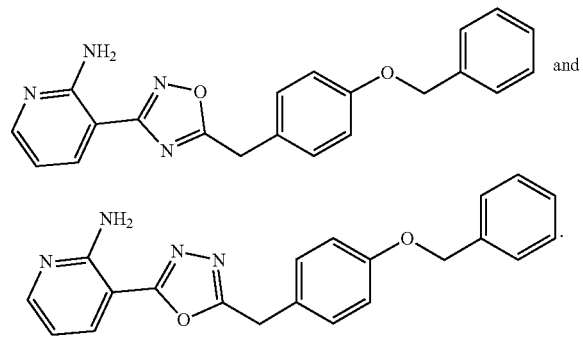

The present disclosure provides a compound of formula (III) or a pharmaceutically acceptable salt thereof, (III)

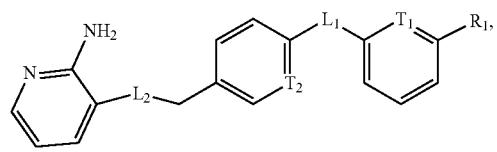

wherein,
$L_2$ is selected from

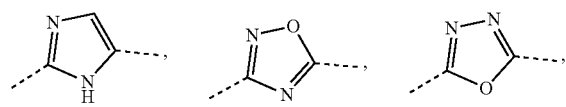 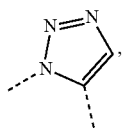

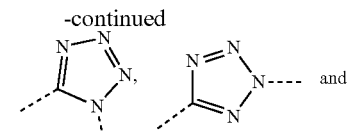

$T_1$ and $T_2$ are selected from CH and N;
$L_1$ is selected from —O—, —CH$_2$O—, and —OCH$_2$—;
$R_1$ is selected from H, F, Cl, Br, I, OH, and NH$_2$;
wherein formula (III) does not comprise molecules

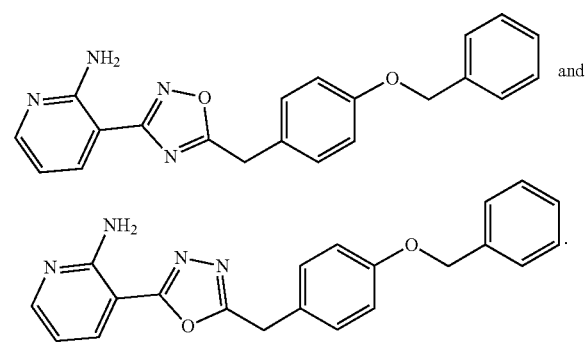

In some embodiments of the present disclosure, the structural moiety

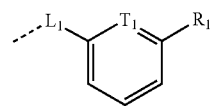

is selected from

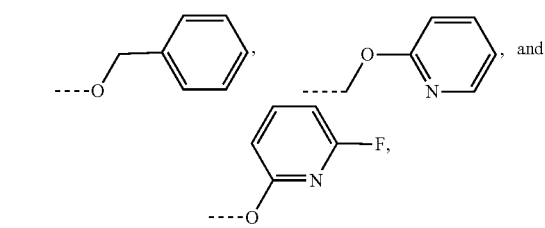

and other variables are as defined in the present disclosure.

In some embodiments of the present disclosure, the compound or the pharmaceutically acceptable salt thereof is selected from (I)

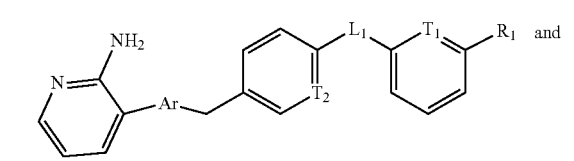 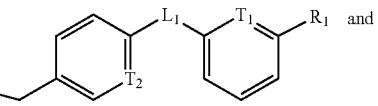

-continued

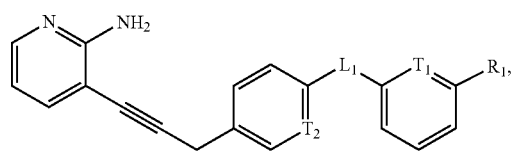
(III-1)

wherein,

Ar is selected from

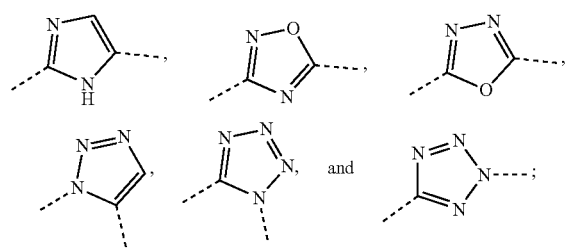

$L_1$, $T_1$, $T_2$, and $R_1$ are as defined in the present disclosure; and formula (I) does not comprise molecules

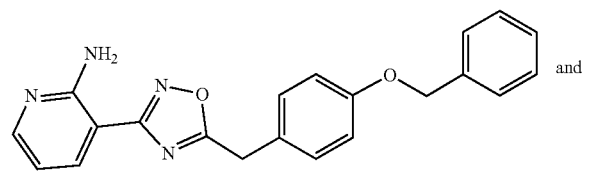

and

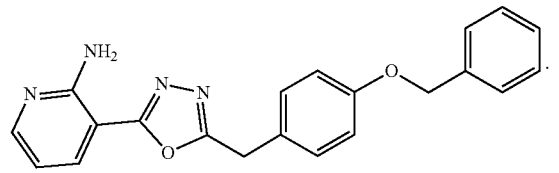

There are still some embodiments of the present disclosure which are obtained by any combination of the above variables.

The present disclosure also provides a compound as shown below or a pharmaceutically acceptable salt thereof,

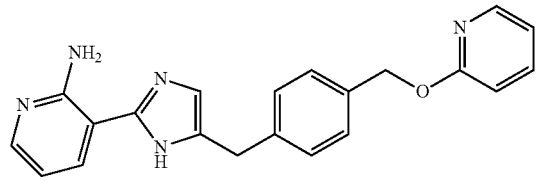

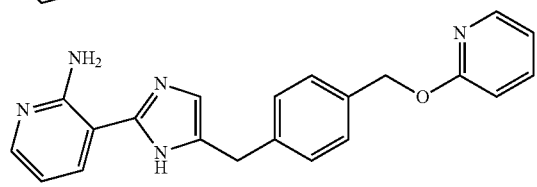

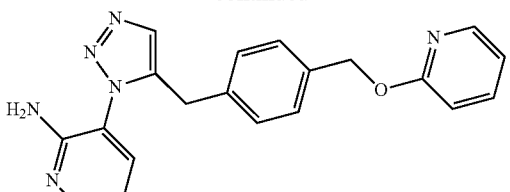

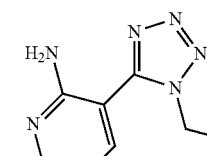

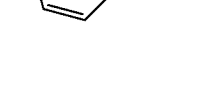

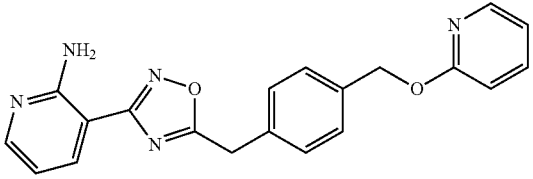

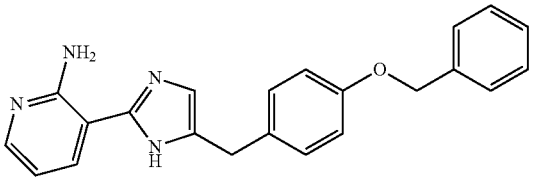

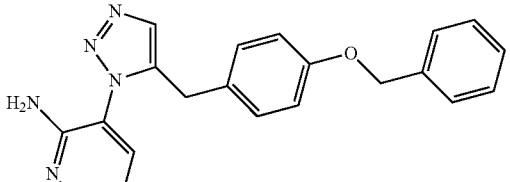

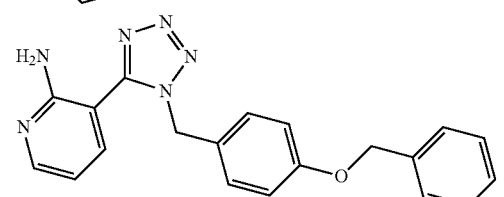

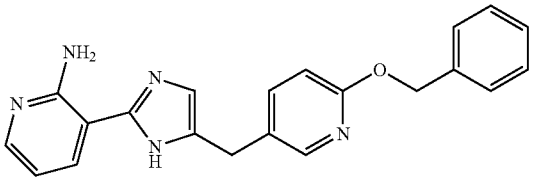

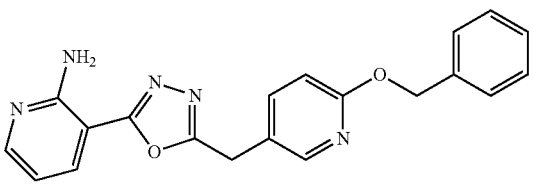

-continued
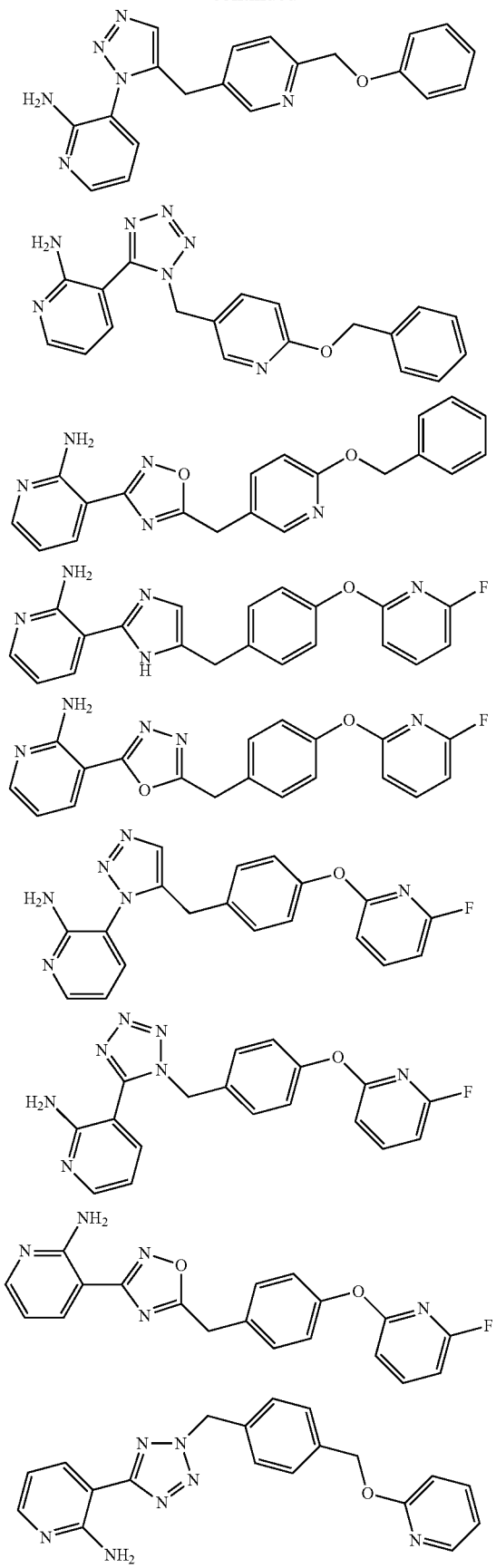
-continued
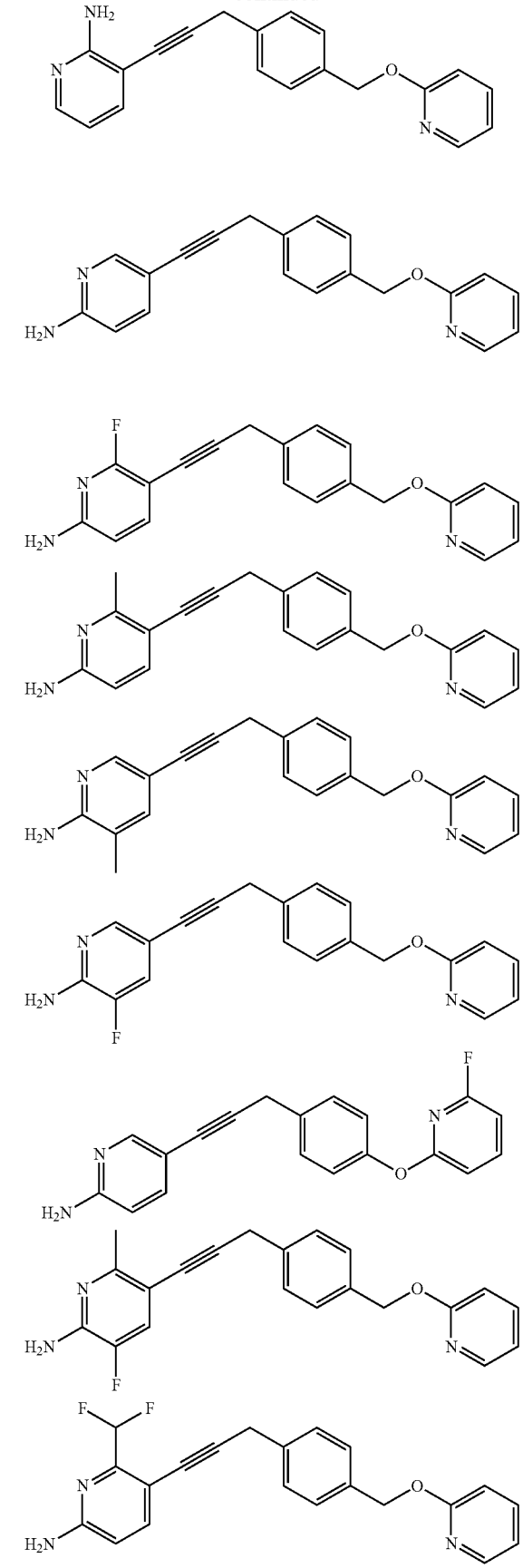

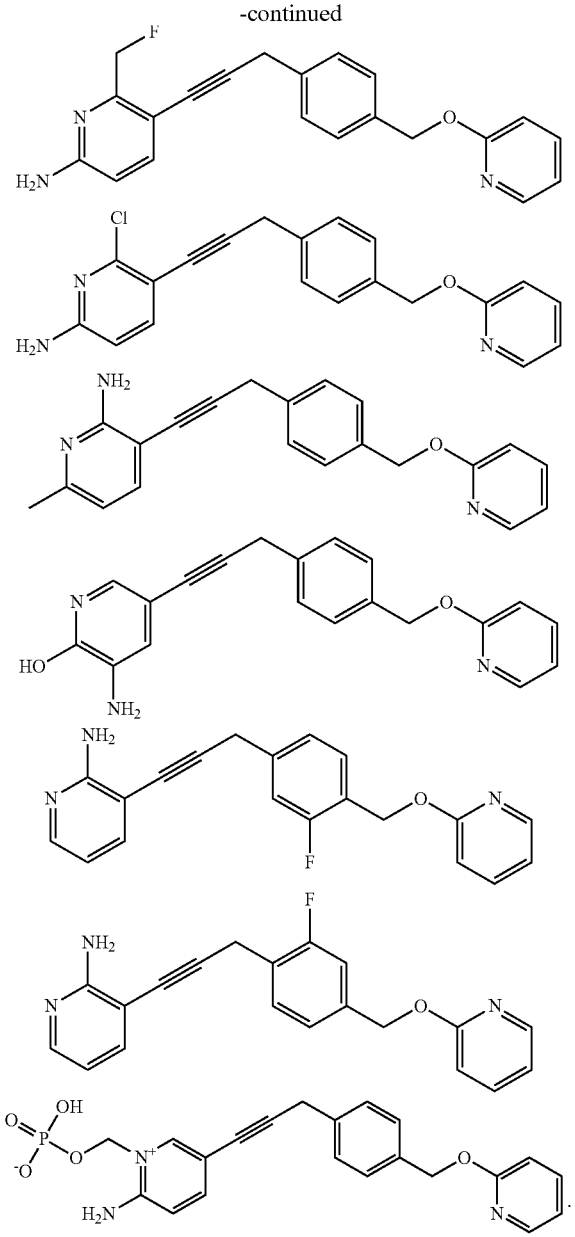

The present disclosure also provides a use of the compound or the pharmaceutically acceptable salt thereof in the manufacture of a drug for treating diseases related to Gwt1.

Technical Effect

The compounds of the present disclosure have good inhibitory activity against *Candida, Cryptococcus,* and *Aspergillus,* can resist mouse death caused by candidemia, and have excellent therapeutic effects on *Candida* vaginal infection. Furthermore, the compounds of the present disclosure have excellent pharmacokinetic properties.

Related Definitions

Unless otherwise specified, the following terms and phrases used herein have the following meanings. A specific term or phrase should not be considered indefinite or unclear in the absence of a particular definition, but should be understood according to the common meaning. When a trading name appears herein, it is intended to refer to its corresponding commercial product or active ingredient thereof.

The term "pharmaceutically acceptable" is used herein in terms of those compounds, materials, compositions, and/or dosage forms, which are suitable for use in contact with human and animal tissues within the scope of reliable medical judgment, without excessive toxicity, irritation, anaphylactic reaction or other problems or complications, commensurate with a reasonable benefit/risk ratio.

The term "pharmaceutically acceptable salt" refers to a salt of the compound of the present disclosure that is prepared by reacting the compound having a specific substituent of the present disclosure with a relatively non-toxic acid or base. When the compound of the present disclosure contains a relatively acidic functional group, a base addition salt can be obtained by contacting the compound with a sufficient amount of a base in a pure solution or a suitable inert solvent. The pharmaceutically acceptable base addition salt includes a salt of sodium, potassium, calcium, ammonium, organic amine or magnesium, or similar salts. When the compound of the present disclosure contains a relatively basic functional group, an acid addition salt can be obtained by contacting the compound with a sufficient amount of acid in a pure solution or a suitable inert solvent. Examples of the pharmaceutically acceptable acid addition salt include an inorganic acid salt, wherein the inorganic acid includes, for example, hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid, phosphorous acid, and the like; and an organic acid salt, wherein the organic acid includes, for example, acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid, and methanesulfonic acid, and the like; and salts of an amino acid (such as arginine and the like), and a salt of an organic acid such as glucuronic acid and the like. Certain specific compounds of the present disclosure contain both basic and acidic functional groups, and thus can be converted to any base or acid addition salt.

The pharmaceutically acceptable salt of the present disclosure can be prepared from the parent compound that contains an acidic or basic moiety by a conventional chemical method. Generally, such salt can be prepared by reacting the free acid or base form of the compound with a stoichiometric amount of an appropriate base or acid in water or an organic solvent or a mixture thereof.

The compounds of the present disclosure may exist in specific geometric or stereoisomeric forms. The present disclosure contemplates all such compounds, including cis and trans isomers, (−)- and (+)-enantiomers, (R)- and (S)-enantiomers, diastereoisomers, (D)-isomers, (L)-isomers, and racemic and other mixtures thereof, such as enantiomers or diastereomer enriched mixtures, all of which are within the scope of the present disclosure. Additional asymmetric carbon atoms may be present in substituents such as alkyl. All these isomers and their mixtures are encompassed within the scope of the present disclosure.

Unless otherwise specified, the term "enantiomer" or "optical isomer" refers to stereoisomers that are mirror images of each other.

Unless otherwise specified, the term "cis-trans isomer" or "geometric isomer" is caused by the inability to rotate freely of double bonds or single bonds of ring-forming carbon atoms.

Unless otherwise specified, the term "diastereomer" refers to a stereoisomer in which a molecule has two or more chiral centers and the relationship between the molecules is not mirror images.

Unless otherwise specified, "(+)" refers to dextrorotation, "(−)" refers to levorotation, and or "(±)" refers to racemic.

Unless otherwise specified, the absolute configuration of a stereogenic center is represented by a wedged solid bond (▲) and a wedged dashed bond (⊿) and the relative configuration of a stereogenic center is represented by a straight solid bond (▬) and a straight dashed bond (⋯), a wave line (∿) is used to represent a wedged solid bond (▲) or a wedged dashed bond (⊿), or the wave line (∿) is used to represent a straight solid bond (▬) and a straight dashed bond (⋯).

Unless otherwise specified, when a double bond structure, such as carbon-carbon double bond, carbon-nitrogen double bond, and nitrogen-nitrogen double bond, exists in the compound, and each of the atoms on the double bond is connected to two different substituents (including the condition where a double bond contains a nitrogen atom, the lone pair of electrons attached on the nitrogen atom is regarded as a substituent connected), if the atom on the double bond in the compound is connected to its substituent by a wave line (∿), this refers to the (Z) isomer, (E) isomer or a mixture of two isomers of the compound. For example, the following formula (A) means that the compound exists as a single isomer of formula (A-1) or formula (A-2) or as a mixture of two isomers of formula (A-1) and formula (A-2); the following formula (B) means that the compound exists in the form of a single isomer of formula (B-1) or formula (B-2) or in the form of a mixture of two isomers of formula (B-1) and formula (B-2). The following formula (C) means that the compound exists as a single isomer of formula (C-1) or formula (C-2) or as two a mixture of two isomers of formula (C-1) and formula (C-2).

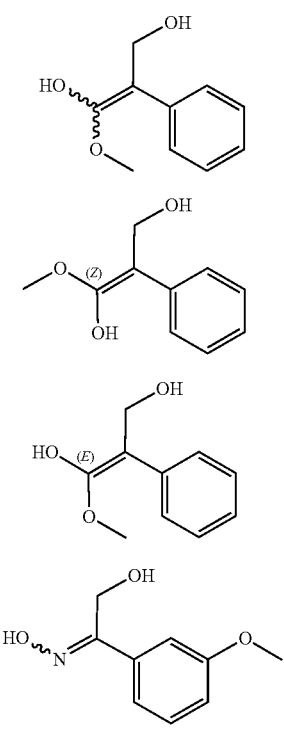

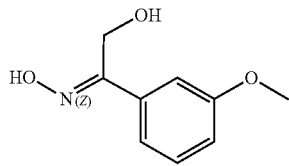

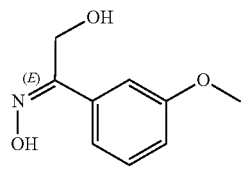

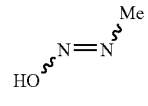

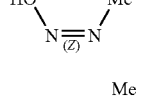

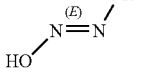

Unless otherwise specified, the term "tautomer" or "tautomeric form" means that at room temperature, the isomers of different functional groups are in dynamic equilibrium and can be transformed into each other quickly. If tautomers possibly exist (such as in solution), the chemical equilibrium of tautomers can be reached. For example, proton tautomer (also called prototropic tautomer) includes interconversion through proton migration, such as keto-enol isomerization and imine-enamine isomerization. Valence tautomer includes some recombination of bonding electrons for mutual transformation. A specific example of keto-enol tautomerization is the tautomerism between two tautomers of pentane-2,4-dione and 4-hydroxypent-3-en-2-one.

Unless otherwise specified, the terms "enriched in one isomer", "enriched in isomers", "enriched in one enantiomer" or "enriched in enantiomers" refer to the content of one of the isomers or enantiomers is less than 100%, and the content of the isomer or enantiomer is greater than or equal to 60%, or greater than or equal to 70%, or greater than or equal to 80%, or greater than or equal to 90%, or greater than or equal to 95%, or greater than or equal to 96%, or greater than or equal to 97%, or greater than or equal to 98%, or greater than or equal to 99%, or greater than or equal to 99.5%, or greater than or equal to 99.6%, or greater than or equal to 99.7%, or greater than or equal to 99.8%, or greater than or equal to 99.9%.

Unless otherwise specified, the term "isomer excess" or "enantiomeric excess" refers to the difference between the relative percentages of two isomers or two enantiomers. For example, if the content of one isomer or enantiomer is 90%, and the content of the other isomer or enantiomer is 10%, the isomer or enantiomer excess (ee value) is 80%.

The compound of the present disclosure may contain an unnatural proportion of atomic isotope at one or more than one atom(s) that constitute the compound. For example, the compound can be radiolabeled with a radioactive isotope, such as tritium ($^3H$), iodine-125 ($^{125}I$), or C-14 ($^{14}C$). For another example, deuterated drugs can be formed by replacing hydrogen with heavy hydrogen, the bond formed by deuterium and carbon is stronger than that of ordinary hydrogen and carbon, compared with non-deuterated drugs, deuterated drugs have the advantages of reduced toxic and side effects, increased drug stability, enhanced efficacy, extended biological half-life of drugs, etc. All isotopic variations of the compound of the present disclosure, whether radioactive or not, are encompassed within the scope of the present disclosure.

The term "optional" or "optionally" means that the subsequently described event or circumstance may, but does not necessarily, occur, and the description includes instances where the event or circumstance occurs and instances where it does not.

The term "substituted" means one or more than one hydrogen atom(s) on a specific atom are substituted by the substituent, including deuterium and hydrogen variables, as long as the valence of the specific atom is normal and the substituted compound is stable. When the substituent is oxygen (i.e., =O), it means two hydrogen atoms are substituted. Positions on an aromatic ring cannot be substituted with a ketone. The term "optionally substituted" means an atom can be substituted with a substituent or not, unless otherwise specified, the type and number of the substituent may be arbitrary as long as being chemically achievable.

When any variable (such as R) occurs in the constitution or structure of the compound more than once, the definition of the variable at each occurrence is independent. Thus, for example, if a group is substituted by 0-2 R, the group can be optionally substituted by up to two R, wherein the definition of R at each occurrence is independent. Moreover, a combination of the substituent and/or the variant thereof is allowed only when the combination results in a stable compound.

When the number of a linking group is 0, such as —(CRR)$_0$—, it means that the linking group is a single bond.

When one of the variables is selected from a single bond, it means that the two groups linked by the single bond are connected directly. For example, when L in A-L-Z represents a single bond, the structure of A-L-Z is actually A-Z.

When the enumerative linking group does not indicate the direction for linking, the direction for linking is arbitrary, for example, the linking group L contained in

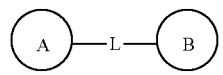

is -M-W-, then -M-W- can link ring A and ring B to form

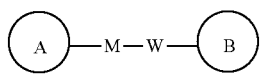

in the direction same as left-to-right reading order, and form

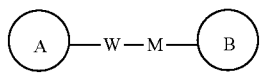

in the direction contrary to left-to-right reading order. A combination of the linking groups, substituents, and/or variables thereof is allowed only when such combination can result in a stable compound.

Unless otherwise specified, when a group has one or more linkable sites, any one or more sites of the group can be linked to other groups through chemical bonds. When the linking site of the chemical bond is not positioned, and there is an H atom at the linkable site, then the number of H atoms at the site will decrease correspondingly with the number of chemical bonds linking thereto so as to meet the corresponding valence. The chemical bond between the site and other groups can be represented by a straight solid bond ( ╱ ), a straight dashed bond ( ⸍ ) or a wavy line ( ⁓ ). For example, the straight solid bond in —OCH$_3$ means that it is linked to other groups through the oxygen atom in the group; the straight dashed bond in

means that it is linked to other groups through the two ends of the nitrogen atom in the group; the wave lines in

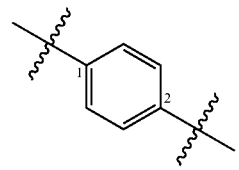 [SMILES: *c1ccc(*)cc1]

means that the phenyl group is linked to other groups through carbon atoms at position 1 and position 2;

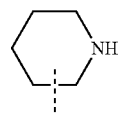

means that it can be linked to other groups through any linkable sites on the piperidinyl by one chemical bond, including at least four types of linkage, including

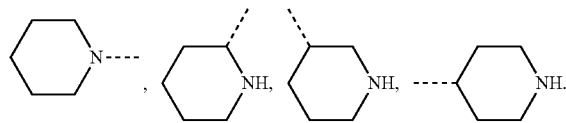

Even though the H atom is drawn on the —N—,

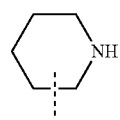

still includes the linkage of

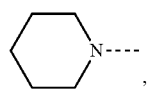

merely when one chemical bond was connected, the H of this site will be reduced by one to the corresponding monovalent piperidinyl.

Unless otherwise specified, the term "$C_{1-6}$ alkyl" refers to a linear or branched saturated hydrocarbon group consisting of 1 to 6 carbon atoms. The $C_{1-6}$ alkyl includes $C_{1-5}$, $C_{1-4}$, $C_{1-3}$, $C_{1-2}$, $C_{2-6}$, $C_{2-4}$, $C_6$, and $C_5$ alkyl, etc.; it can be monovalent (such as methyl), divalent (such as methylene), or multivalent (such as methine). Examples of $C_{1-6}$ alkyl include, but are not limited to, methyl (Me), ethyl (Et), propyl (including n-propyl and isopropyl), butyl (including n-butyl, isobutyl, s-butyl, and t-butyl), pentyl (including n-pentyl, isopentyl, and neopentyl), hexyl, etc.

Unless otherwise specified, the term "$C_{1-4}$ alkyl" refers to a linear or branched saturated hydrocarbon group consisting of 1 to 4 carbon atoms. The $C_{1-4}$ alkyl includes $C_{1-2}$, $C_{1-3}$, and $C_{2-3}$ alkyl, etc.; it can be monovalent (such as methyl), divalent (such as methylene), or multivalent (such as methine). Examples of $C_{1-4}$ alkyl include, but are not limited to, methyl (Me), ethyl (Et), propyl (including n-propyl and isopropyl), butyl (including n-butyl, isobutyl, s-butyl, and t-butyl), etc.

Unless otherwise specified, the term "$C_{1-3}$ alkyl" refers to a linear or branched saturated hydrocarbon group consisting of 1 to 3 carbon atoms. The $C_{1-3}$ alkyl includes $C_{1-2}$ and $C_{2-3}$ alkyl, etc.; it can be monovalent (such as methyl), divalent (such as methylene), or multivalent (such as methine). Examples of $C_{1-3}$ alkyl include, but are not limited to, methyl (Me), ethyl (Et), propyl (including n-propyl and isopropyl), etc.

Unless otherwise specified, $C_{n-n+m}$ or $C_n$-$C_{n+m}$ includes any specific case of n to n+m carbons, for example, $C_{1-12}$ includes $C_1$, $C_2$, $C_3$, $C_4$, $C_5$, $C_6$, $C_7$, $C_8$, $C_9$, $C_{10}$, $C_{11}$, and $C_{12}$, and any range from n to n+m is also included, for example, $C_{1-12}$ includes $C_{1-3}$, $C_{1-6}$, $C_{1-9}$, $C_{3-6}$, $C_{3-9}$, $C_{3-12}$, $C_{6-9}$, $C_{6-12}$, and $C_{9-12}$, etc.; similarly, n-membered to n+m-membered means that the number of atoms on the ring is from n to n+m, for example, 3- to 12-membered ring includes 3-membered ring, 4-membered ring, 5-membered ring, 6-membered ring, 7-membered ring, 8-membered ring, 9-membered ring, 10-membered ring, 11-membered ring, and 12-membered ring, and any range from n to n+m is also included, for example, 3- to 12-membered ring includes 3- to 6-membered ring, 3- to 9-membered ring, 5- to 6-membered ring, 5- to 7-membered ring, 6- to 7-membered ring, 6- to 8-membered ring, and 6- to 10-membered ring, etc.

The term "protecting group" includes, but is not limited to, "amino protecting group", "hydroxyl protecting group" or "mercapto protecting group". The term "amino protecting group" refers to a protecting group suitable for preventing the side reactions occurring at the nitrogen of an amino. Representative amino protecting groups include, but are not limited to: formyl; acyl, such as alkanoyl (e.g., acetyl, trichloroacetyl or trifluoroacetyl); alkoxycarbonyl, such as tert-butoxycarbonyl (Boc); arylmethoxycarbonyl such as benzyloxycarbonyl (Cbz) and 9-fluorenylmethoxycarbonyl (Fmoc); arylmethyl, such as benzyl (13n), trityl (Tr), 1,1-bis-(4'-methoxyphenyl)methyl; silyl, such as trimethylsilyl (TMS) and tert-butyldimethylsilyl (TBS), etc. The term "hydroxyl protecting group" refers to a protecting group suitable for preventing the side reactions of hydroxyl. Representative hydroxyl protecting groups include, but are not limited to: alkyl, such as methyl, ethyl, and tert-butyl; acyl, such as alkanoyl (e.g., acetyl); arylmethyl, such as benzyl (Bn), p-methoxybenzyl (PMB), 9-fluorenylmethyl (Fin), and diphenylmethyl (benzhydryl, DPM); silyl, such as trimethylsilyl (TMS) and tert-butyl dimethyl silyl (TBS), etc.

The compounds of the present disclosure can be prepared by a variety of synthetic methods known to those skilled in the art, including the specific embodiments listed below, the embodiments formed by their combination with other chemical synthesis methods, and equivalent alternatives known to those skilled in the art, preferred implementations include but are not limited to the embodiments of the present disclosure.

The structure of the compounds of the present disclosure can be confirmed by conventional methods known to those skilled in the art, and if the disclosure involves an absolute configuration of a compound, then the absolute configuration can be confirmed by means of conventional techniques in the art. For example, in the case of single crystal X-ray diffraction (SXRD), the absolute configuration can be confirmed by collecting diffraction intensity data from the cultured single crystal using a Bruker D8 venture diffractometer with CuKα radiation as the light source and scanning mode: φ/ω scan, and after collecting the relevant data, the crystal structure can be further analyzed by the direct method (Shelxs97).

DETAILED DESCRIPTION OF THE PREFERRED EMBODIMENT

The present disclosure is described in detail by the embodiments below, but it does not mean that there are any adverse restrictions on the present disclosure. The present disclosure has been described in detail herein, and its specific embodiments have also been disclosed; for one skilled in the art, it is obvious to make various modifications and improvements to the embodiments of the present disclosure without departing from the spirit and scope of the present disclosure.

Example 3

Synthetic Route:

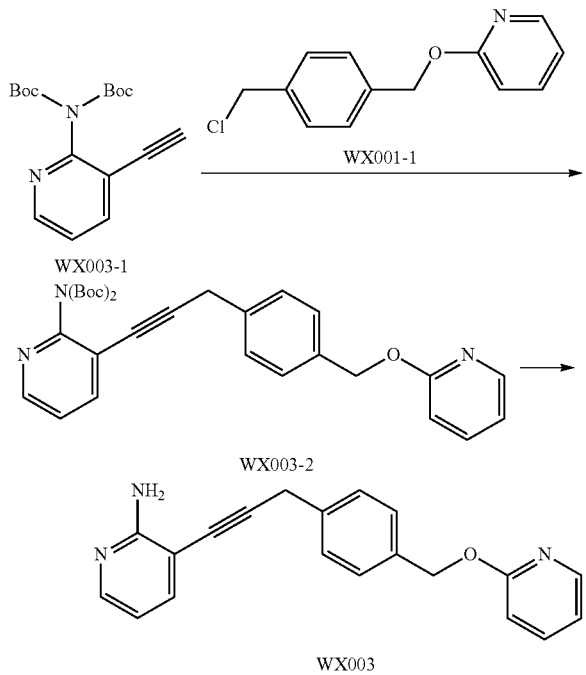

Step 1: Synthesis of Compound WX003-2

Compound WX003-1 (100 mg, 314.10 μmol) and compound WX001-1 (73 mg, 314.10 μmol) were dissolved in acetonitrile (5 mL), and then cesium carbonate (256 mg, 785.26 μmol), XPhos (45 mg, 94.23 μmol), and Pd(CH$_3$CN)$_2$Cl$_2$ (8 mg, 31.41 μmol) were added thereto. The reaction was stirred at 90° C. under nitrogen atmosphere for 2 hours. LCMS showed the starting material was completely reacted. The reaction mixture was directly filtered and the filtrate was concentrated. The crude product was purified by preparative thin-layer chromatography (petroleum ether:ethyl acetate=1:1) to obtain compound WX003-2. MS m/z (ESI): 516.3 [M+H]$^+$.

Step 2: Synthesis of Compound WX003

Compound WX003-2 (50 mg, 96.97 μmol) was dissolved in formic acid (233 mg, 4.85 mmol) and stirred at 15° C. for 16 hours. The reaction mixture was directly concentrated, and the crude product was purified by preparative HPLC (formic acid system, chromatographic column: Phenomenex Luna C18, 75×30 mm×3 μm; mobile phase: [water (0.2% formic acid)-acetonitrile]; acetonitrile %: 20% to 50%, 8 min). Compound WX003 was obtained. MS m/z (ESI): 316.1 [M+H]$^+$; $^1$H NMR (400 MHz, DMSO-d$_6$) δ=8.17-8.16 (m, 1H), 7.92-7.90 (m, 1H), 7.73-7.70 (m, 1H), 7.49-7.47 (m, 1H), 7.47-7.42 (m, 4H), 6.99-6.97 (m, 1H), 6.86 (d, J=8.4 Hz, 1H), 6.52-6.49 (m, 1H), 6.08 (s, 2H), 5.33 (s, 2H), 3.92 (s, 2H).

Example 4

Synthetic Route:

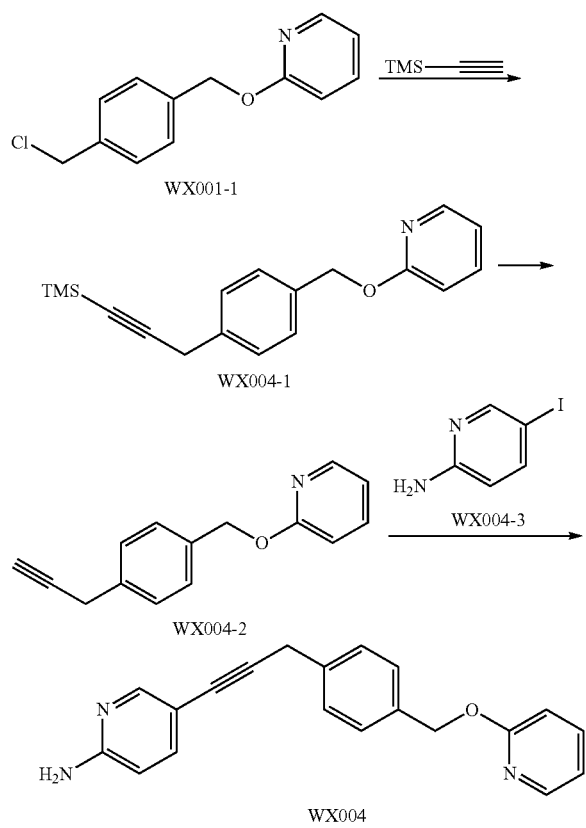

Step 1: Synthesis of Compound WX004-1

WX001-1 (7 g, 29.95 mmol) and Cs$_2$CO$_3$ (19.52 g, 59.91 mmol) were dissolved in THF (210 mL), and the reaction system was replaced with nitrogen. Pd(MeCN)$_2$Cl$_2$ (777 mg, 3.00 mmol) and XPhos (2.14 g, 4.49 mmol) were added thereto, and the reaction system was replaced with nitrogen again. Trimethylsilylacetylene (14.71 g, 149.77 mmol, 20.75 mL) was added using a syringe, and then the reaction was heated to 65° C. and stirred for 16 hours. The reaction mixture was concentrated under reduced pressure to obtain a crude product, which was purified by column chromatography (0 to 10% ethyl acetate in petroleum ether) to obtain WX004-1. $^1$H NMR (400 MHz, CDCl$_3$) δ=8.21-8.19 (m, 1H), 7.65-7.60 (m, 1H), 7.46-7.42 (m, 2H), 7.40-7.36 (m, 2H), 6.92-6.90 (m, 1H), 6.84-6.81 (m, 1H), 5.39 (s, 2H), 3.68 (s, 2H), 0.21 (s, 9H).

Step 2: Synthesis of Compound WX004-2

WX004-1 (0.9 g, 3.05 mmol) was dissolved in THF (12 mL), and then HOAc (366 mg, 6.09 mmol, 348 μL) and TBAF (1 M THF, 6.09 mL) were added thereto. The reaction was stirred at 20° C. for 16 hours. The reaction mixture was added with water (20 mL), and extracted with ethyl acetate (20 mL×3). The organic phases were combined and washed with saturated sodium chloride solution (10 mL×3), concentrated under reduced pressure to obtain a crude product, which was then purified by column chromatography (0 to 10% ethyl acetate in petroleum ether) to obtain WX004-2. $^1$H NMR (400 MHz, CDCl$_3$) δ=8.20 (dd, J=1.3, 5.0 Hz, 1H), 7.61-7.59 (m, 1H), 7.46-7.44 (m, 2H), 7.42-7.38 (m, 2H), 6.92-6.90 (m, 1H), 6.82 (d, J=8.4 Hz, 1H), 5.39 (s, 2H), 3.64 (d, J=2.8H, 2H), 2.21 (t, J=2.8 Hz, 1H).

Step 3: Synthesis of Compound WX004

To a reaction flask was added WX004-3 (1 g, 4.55 mmol), WX004-2 (1.01 g, 4.55 mmol), and THF (100 mL), and then added Pd(MeCN)$_2$Cl$_2$ (177 mg, 681.79 μmol), XPhos (325 mg, 681.79 μmol), CuI (87 mg, 454.52 μmol), and TEA (3.68 g, 36.36 mmol, 5.06 mL) successively. The reaction system was replaced with nitrogen three times and the reaction mixture was stirred at 15° C. for 16 hours. The reaction mixture was filtered through diatomite, and the filtrate was added with water (50 mL) and extracted with ethyl acetate (3×50 mL). The organic phases were combined, dried over anhydrous sodium sulfate, and concentrated under reduced pressure to obtain a crude product. The crude product was purified by column chromatography (petroleum ether:ethyl acetate=1:1 to 0:1), and then purified by HPLC (chromatographic column: Phenomenex Luna C18 200×40 mm×10 μm; mobile phase: [water (0.2% FA)-ACN]; ACN %: 15% to 55%, 8 min) to obtain WX004. MS m/z (ESI): 316 [M+H]$^+$. $^1$H NMR (400 MHz, DMSO-d$_6$) δ=8.17-8.16 (m, 1H), 7.99 (s, 1H), 7.72-7.71 (m, 1H), 7.42-7.36 (m, 5H), 7.00-6.98 (m, 1H), 6.85 (d, J=8.4 Hz, 1H), 6.39 (d, J=8.8 Hz, 1H), 6.24 (s, 2H), 5.32 (s, 2H), 3.83 (s, 2H).

Example 5

Synthetic Route:

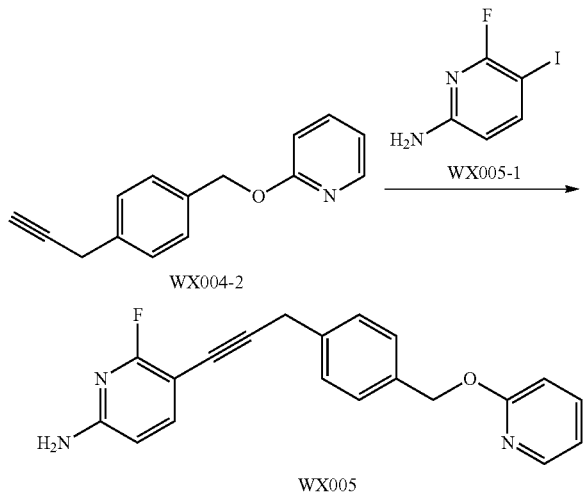

Compound WX004-2 (563 mg, 2.52 mmol) and WX005-1 (500 mg, 2.10 mmol) were dissolved in THF (20 mL), and then Pd(MeCN)$_2$Cl$_2$ (54 mg, 210.08 μmol), XPhos (150 mg, 315.12 μmol), CuI (40 mg, 210.08 μmol), and TEA (1.70 g, 16.81 mmol, 2.34 mL) were added thereto. The reaction system was replaced with nitrogen three times and the reaction mixture was stirred at 15° C. for 16 hours. The reaction mixture was directly filtered and the filtrate was concentrated to obtain a crude product. The crude product was preliminarily purified by column chromatography (gradient elution, petroleum ether:ethyl acetate=10:1 to 2:1), and then purified by preparation (formic acid system, chromatographic column: Phenomenex Luna C18 200×40 mm×10 μm; mobile phase: [water (0.2% FA)-ACN]; ACN %: 50% to 90%, 8 min) to obtain WX005. MS m/z (ESI): 334 [M+H]$^+$. $^1$H NMR (400 MHz, DMSO-d$_6$) δ: 8.17-8.16 (m, 1H), 7.72-7.70 (m, 1H), 7.53-7.51 (m, 1H), 7.43-7.36 (m, 4H), 6.99-6.98 (m, 1H), 6.86 (d, J=8.4 Hz, 1H), 6.70 (s, 2H), 6.30-6.27 (m, 1H), 5.33 (s, 2H), 3.86 (s, 2H).

Example 6

Synthetic Route:

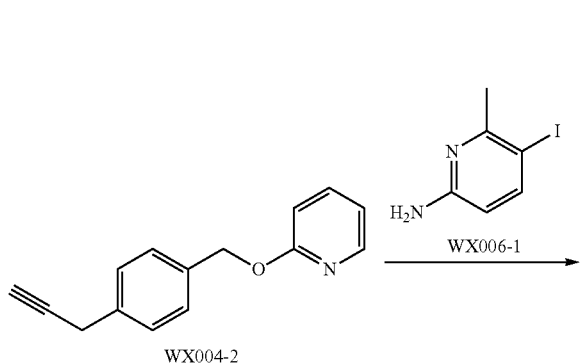

To a reaction flask was added WX006-1 (100 mg, 427.28 μmol) and WX004-2 (95 mg, 427.28 μmol), and added THF (5 mL). The reaction mixture was stirred, and then Pd(MeCN)$_2$Cl$_2$ (11 mg, 42.73 μmol), XPhos (30 mg, 64.09 μmol), CuI (8 mg, 42.73 μmol), and TEA (346 mg, 3.42 mmol, 476 μL) were added thereto successively. The reaction system was replaced with nitrogen three times and the reaction mixture was stirred at 15° C. for 16 hours. The reaction mixture was filtered through diatomite and concentrated under reduced pressure to obtain a crude product. The crude product was separated by a preparative thin-layer chromatography plate (petroleum ether:ethyl acetate=2:1) and purified by preparative HPLC (chromatographic column: Phenomenex Gemini-NX C18 75×30 mm×3 μm; mobile phase: [water (10 mM NH$_4$HCO$_3$)-ACN]; ACN %: 35% to 55%, 8 min) to obtain WX006. MS m/z (ESI): 330 [M+H]$^+$, $^1$H NMR (400 MHz, CDCl$_3$) δ: 8.19 (d, J=3.2 Hz, 1H), 7.58-7.61 (m, 1H), 7.41-7.46 (m, 5H), 6.87-6.90 (m, 1H), 6.81 (d, J=8.4 Hz, 1H), 6.29 (d, J=8.4 Hz, 1H), 5.40 (s, 2H), 4.51 (s, 2H), 3.86 (s, 2H), 2.52 (s, 3H).

Example 7

Synthetic Route:

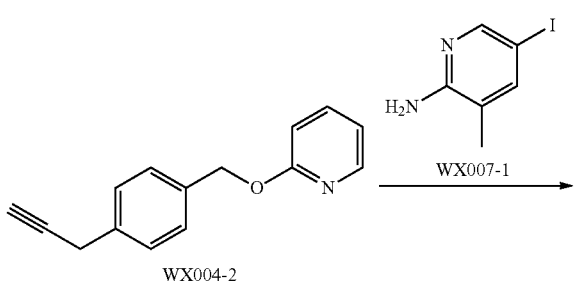

Compound WX004-2 (191 mg, 854.57 μmol) and compound WX007-1 (0.2 g, 854.57 μmol) were dissolved in tetrahydrofuran (4 mL), and triethylamine (692 mg, 6.84 mmol, 952 μL) was added thereto. After the reaction system was replaced with nitrogen, cuprous iodide (16 mg, 85.46 μmol), bis(acetonitrile)dichloropalladium (22 mg, 85.46 μmol), and 2-dicyclohexylphosphino-2,4,6-triisopropylbiphenyl (61 mg, 128.18 µmol) were added thereto. The reaction system was replaced with nitrogen again, and the reaction mixture was stirred at 40° C. for 16 hours. The reaction mixture was filtered and concentrated under reduced pressure to obtain a crude product, which was purified by column chromatography (eluent: 0 to 50% ethyl acetate in petroleum ether) to obtain WX007. MS m/z (ESI): 330.2 [M+H]$^+$, $^1$H NMR (400 MHz, CDCl$_3$) δ=8.23-8.17 (m, 1H), 8.08 (s, 1H), 7.65-7.57 (m, 1H), 7.49-7.41 (m, 4H), 7.37 (s, 1H), 6.94-6.89 (m, 1H), 6.82 (d, J=8.3 Hz, 1H), 5.39 (s, 2H), 4.60 (s, 2H), 3.84 (s, 2H), 2.13 (s, 3H).

Example 8

Synthetic Route:

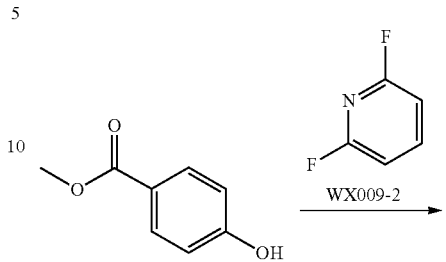

Compound WX008-1 (200 mg, 840.33 µmol) and compound WX004-2 (225 mg, 1.01 mmol) were dissolved in tetrahydrofuran (8 mL), and triethylamine (680 mg, 6.72 mmol) was added thereto. After the reaction system was replaced with nitrogen, cuprous iodide (16 mg, 84.03 µmol), bis(acetonitrile)dichloropalladium (22 mg, 84.03 µmol), and 2-dicyclohexylphosphino-2,4,6-triisopropylbiphenyl (60 mg, 126.05 µmol) were added thereto. The reaction system was replaced with nitrogen again, and the reaction mixture was stirred at 40° C. for 16 hours. After the reaction mixture was cooled to room temperature, the reaction mixture was filtered and concentrated under reduced pressure to obtain a crude product. The crude product was purified by preparative HPLC (chromatographic column: Phenomenex Gemini-NX C18 75×30 mm×3 µm; mobile phase: [water (0.225% FA)-ACN]; ACN %: 50% to 60%, 7 min) to obtain WX008. MS m/z (ESI): 334.0 [M+H]$^+$, $^1$H NMR (400 MHz, CDCl$_3$) δ=8.11 (dd, J=1.2, 5.0 Hz, 1H), 7.53-7.50 (m, 1H), 7.40-7.36 (m, 2H), 7.34-7.31 (m, 2H), 7.21 (d, J=1.5 Hz, 1H), 7.18 (d, J=1.6 Hz, 1H), 6.81 (dd, J=5.6, 6.8 Hz, 1H), 6.73 (d, J=8.2 Hz, 1H), 5.30 (s, 2H), 4.71 (s, 2H), 3.74 (s, 2H).

Example 9

Synthetic Route:

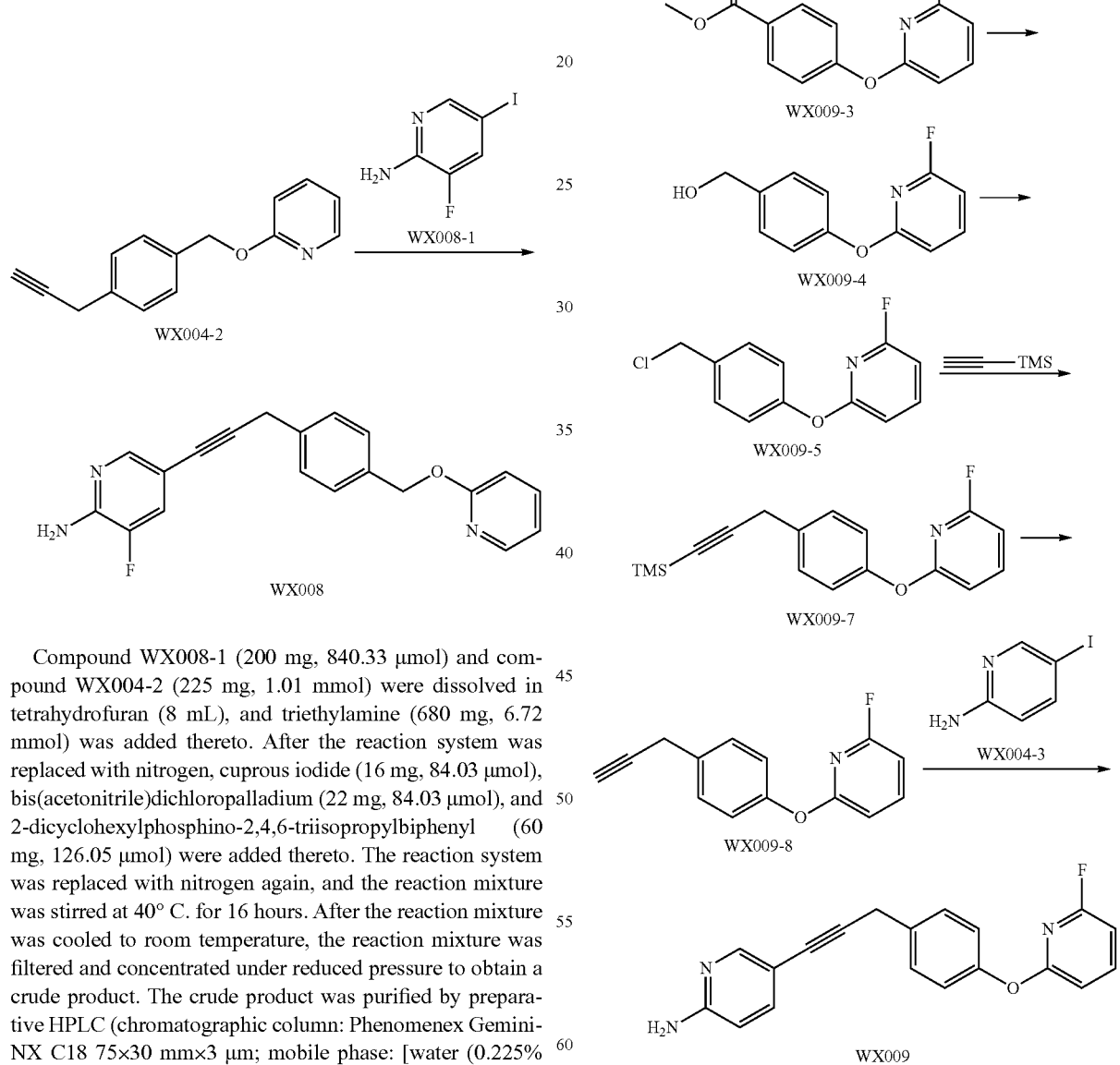

Step 1: Synthesis of Compound WX009-3

Compound WX009-1 (3.97 g, 26.07 mmol) and compound WX009-2 (3 g, 26.07 mmol, 2.38 mL) were dissolved in acetonitrile (30 mL), and $K_2CO_3$ (10.81 g, 78.21 mmol) was added thereto. The reaction mixture was stirred at 85° C. for 21 hours. The reaction mixture was added with water (30 mL) and extracted with ethyl acetate (30 mL×2). The organic phases were combined and washed with saturated sodium chloride solution (20 mL). The organic phase was concentrated under reduced pressure to obtain a crude product. The crude product was purified by column chromatography (0 to 15% ethyl acetate in petroleum ether) to obtain compound WX009-3. MS m/z (ESI): 247.8 $[M+H]^+$, $^1$H NMR (400 MHz, $CDCl_3$) δ=8.14-8.07 (m, 2H), 7.83-7.79 (m, 1H), 7.24-7.20 (m, 2H), 6.84-6.82 (m, 1H), 6.65-6.74 (m, 1H), 3.94 (s, 3H).

Step 2: Synthesis of Compound WX009-4

Compound WX009-3 (2 g, 8.09 mmol) was dissolved in toluene (30 mL), and the reaction system was replaced with nitrogen and cooled to 0° C. Diisobutylaluminium hydride (1 M THF solution, 24.27 mL) was slowly added dropwise and the reaction mixture was stirred continuously for 2 hours. The reaction mixture was slowly added to potassium bisulfate solution (20 mL), stirred for 10 min, and extracted with ethyl acetate (20 mL×3). The organic phases were combined and concentrated under reduced pressure to obtain a crude product. The crude product was purified by column chromatography (0 to 30% ethyl acetate in petroleum ether). Compound WX009-4 was obtained. MS m/z (ESI): 220.0 $[M+H]^+$, $^1$H NMR (400 MHz, $CDCl_3$) δ=7.76-7.72 (m, 1H), 7.40 (d, J=8.4 Hz, 2H), 7.13 (d, J=8.4 Hz, 2H), 6.74-6.72 (m, 1H), 6.63-6.61 (m, 1H), 4.69 (s, 2H).

Step 3: Synthesis of Compound WX009-5

To a reaction flask was added thionyl chloride (10 mL), and the system was cooled to 0° C., and then compound WX009-4 (1 g, 4.56 mmol) was added thereto. The reaction mixture was warmed up to 20° C. and stirred for 30 minutes. The reaction mixture was concentrated under reduced pressure to obtain a crude product. The crude product was added with saturated sodium bicarbonate solution (50 mL) and extracted with ethyl acetate (50 mL×2). The organic phases were combined and concentrated under reduced pressure to obtain compound WX009-5. MS m/z (ESI): 238.0 $[M+H]^+$, $^1$H NMR (400 MHz, $CDCl_3$) δ=7.70-7.68 (m, 1H), 7.39-7.32 (m, 2H), 7.09-7.04 (m, 2H), 6.68 (dd, J=1.2, 8.0 Hz, 1H), 6.55 (dd, J=2.4, 7.6 Hz, 1H), 4.54 (s, 2H).

Step 4: Synthesis of Compound WX009-7

Compound WX009-5 (0.7 g, 2.95 mmol) was dissolved in tetrahydrofuran (15 mL), and cesium carbonate (1.92 g, 5.89 mmol) was added thereto, and the reaction system was replaced with nitrogen. 2-Dicyclohexylphosphino-2,4,6-triisopropylbiphenyl (211 mg, 441.81 mol) and bis(acetonitrile)dichloropalladium (76 mg, 294.54 μmol) were added thereto, and the reaction system was replaced with nitrogen again, and trimethylsilylacetylene (1.45 g, 14.73 mmol, 2.04 mL) was added thereto by a syringe. The reaction mixture was stirred at 65° C. for 16 hours. After cooling to room temperature, the reaction mixture was concentrated under reduced pressure to obtain a crude product. The crude product was purified by column chromatography (0 to 10% ethyl acetate in petroleum ether) to obtain compound WX009-7. MS m/z (ESI): 300.1 $[M+H]^+$, $^1$H NMR (400 MHz, $CDCl_3$) δ=7.80-7.75 (m, 1H), 7.40 (d, J=8.8 Hz, 2H), 7.14-7.10 (m, 2H), 6.74-6.73 (m, 1H), 6.62 (dd, J=2.4, 7.6 Hz, 1H), 3.69 (s, 2H), 0.21 (s, 9H).

Step 5: Synthesis of Compound WX009-8

Compound WX009-7 (0.7 g, 2.34 mmol) was dissolved in tetrahydrofuran (10 mL), and then acetic acid (281 mg, 4.68 mmol, 267 μL) and tetrabutylammonium fluoride (1 M tetrahydrofuran solution) (1 M, 4.68 mL) were added thereto. The reaction was stirred at 20° C. for 16 hours. The reaction mixture was added with water (10 mL) and extracted with ethyl acetate (10 mL×3). The organic phases were combined and concentrated under reduced pressure to obtain a crude product. The crude product was purified by column chromatography (0 to 10% ethyl acetate in petroleum ether). Compound WX009-8 was obtained. MS m/z (ESI): 228.0 $[M+H]^+$, $^1$H NMR (400 MHz, $CDCl_3$) δ=7.79-7.73 (m, 1H), 7.41 (d, J=8.4 Hz, 2H), 7.13 (d, J=8.4 Hz, 2H), 6.75-6.73 (m, 1H), 6.64-6.62 (m, 1H), 3.65 (d, J=2.8 Hz, 2H), 2.23 (t, J=2.8 Hz, 1H).

Step 6: Synthesis of Compound WX009

Compound WX004-3 (0.5 g, 2.27 μmol) and compound WX009-8 (620 mg, 2.73 mmol) were dissolved in tetrahydrofuran (20 mL), and triethylamine (1.84 g, 18.18 mmol, 2.53 mL) was added thereto. After the reaction system was replaced with nitrogen, cuprous iodide (43 mg, 227.26 μmol), bis(acetonitrile)dichloropalladium (59 mg, 227.26 μmol), and 2-dicyclohexylphosphino-2,4,6-triisopropylbiphenyl (163 mg, 340.89 μmol) were added thereto. The reaction system was replaced with nitrogen again, and the reaction mixture was stirred at 40° C. for 16 hours. After cooling to room temperature, the reaction mixture was filtered and concentrated under reduced pressure to obtain a crude product. The crude product was purified by preparative HPLC (chromatographic column: Phenomenex Gemini-NX C18 75×30 mm×3 m; mobile phase: [water (0.225% FA)-ACN]; ACN %: 15% to 45%, 7 min). Compound WX009 was obtained. MS m/z (ESI): 320.1 $[M+H]^+$, $^1$H NMR (400 MHz, $CDCl_3$) δ=8.14 (s, 1H), 7.78-7.76 (m, 1H), 7.54 (dd, J=2.0, 8.8 Hz, 1H), 7.44 (d, J=8.8 Hz, 2H), 7.17-7.10 (m, 2H), 6.75 (dd, J=1.2, 8.0 Hz, 1H), 6.62 (dd, J=2.4, 7.6 Hz, 1H), 6.49 (d, J=8.4 Hz, 1H), 5.17 (s, 2H), 3.84 (s, 2H).

Example 10

Synthetic Route:

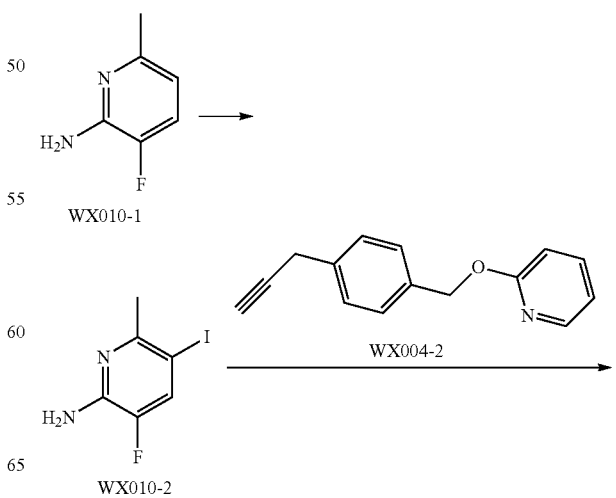

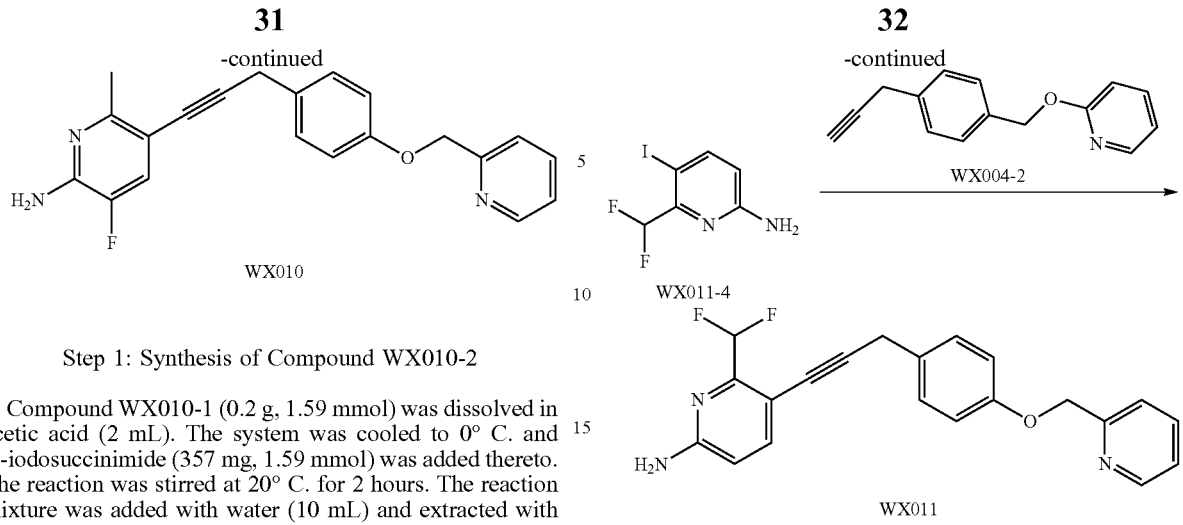

Step 1: Synthesis of Compound WX010-2

Compound WX010-1 (0.2 g, 1.59 mmol) was dissolved in acetic acid (2 mL). The system was cooled to 0° C. and N-iodosuccinimide (357 mg, 1.59 mmol) was added thereto. The reaction was stirred at 20° C. for 2 hours. The reaction mixture was added with water (10 mL) and extracted with ethyl acetate (10 mL×3). The organic phases were combined and concentrated under reduced pressure to obtain a crude product. The crude product was purified by column chromatography (0 to 30% ethyl acetate in petroleum ether). Compound WX010-2 was obtained, MS m/z (ESI): 252.7 $[M+H]^+$.

Step 2: Synthesis of Compound WX010

Compound WX010-2 (0.1 g, 396.78 μmol) and compound WX004-2 (106 mg, 476.14 μmol) were dissolved in tetrahydrofuran (4 mL), and triethylamine (321 mg, 3.17 mmol, 441.82 μL) was added thereto. After the reaction system was replaced with nitrogen, cuprous iodide (8 mg, 39.68 μmol), bis(acetonitrile)dichloropalladium (10 mg, 39.68 μmol), and 2-dicyclohexylphosphino-2,4,6-triisopropylbiphenyl (28 mg, 59.52 μmol) were added thereto. The reaction system was replaced with nitrogen again, and the reaction mixture was stirred at 40° C. for 16 hours. The reaction mixture was filtered and concentrated under reduced pressure to obtain a crude product. The crude product was purified by preparative HPLC (chromatographic column: Phenomenex Gemini-NX C18 75×30 mm×3 μm; mobile phase: [water (0.225% FA)-ACN]; ACN %: 30% to 60%, 7 min). Compound WX010 was obtained. MS m/z (ESI): 348.1 $[M+H]^+$, $^1$H NMR (400 MHz, CDCl$_3$) δ=8.20 (d, J=4.4 Hz, 1H), 7.66-7.58 (m, 1H), 7.52-7.41 (m, 4H), 7.23 (d, J=10.8 Hz, 1H), 6.95-6.89 (m, 1H), 6.82 (d, J=8.0 Hz, 1H), 5.39 (s, 2H), 4.75 (s, 2H), 3.87 (s, 2H), 2.50 (s, 3H).

Example 11

Synthetic Route:

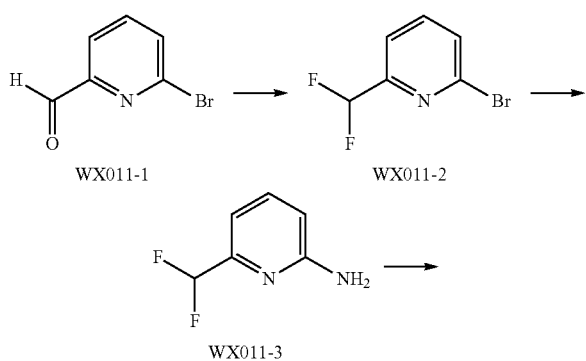

Step 1: Synthesis of Compound WX011-2

Compound WX011-1 (2 g, 10.75 mmol) was dissolved in dichloromethane (20 mL), and the system was cooled to 0° C., and then diethylaminosulfur trifluoride (2.25 g, 13.98 mmol, 1.85 mL) was added thereto. The reaction mixture was warmed up to 20° C. and stirred for 16 hours. The reaction mixture was added with saturated sodium bicarbonate solution (10 mL) and extracted with ethyl acetate (10 mL×3). The organic phase was concentrated under reduced pressure to obtain a crude product. The crude product was purified by column chromatography (0 to 30% ethyl acetate in petroleum ether) to obtain compound WX011-2, MS m/z (ESI): 209.9 $[M+H]^+$.

Step 2: Synthesis of Compound WX011-3

Compound WX011-2 (1.5 g, 7.21 mmol), N,N-dimethylethylenediamine (64 mg, 721.14 μmol, 77.62 μL), and cuprous oxide (52 mg, 360.57 μmol) were dissolved in ethylene glycol (15 mL). Ammonia water (9.64 g, 76.98 mmol, 10.59 mL, content of 28%) and potassium carbonate (199 mg, 1.44 mmol) were added thereto. The reaction mixture was stirred at 120° C. for 12 hours. After cooling to room temperature, the reaction mixture was added with water (20 mL) and extracted with ethyl acetate (20 mL×3). The organic phases were combined and concentrated under reduced pressure to obtain a crude product. The crude product was purified by column chromatography (0 to 30% ethyl acetate in petroleum ether) to obtain compound WX011-3. $^1$H NMR (400 MHz, CDCl$_3$) δ=7.57-7.53 (m, 1H), 6.95 (d, J=7.2 Hz, 1H), 6.63-6.29 (m, 2H), 4.68 (s, 2H).

Step 3: Synthesis of Compound WX011-4

Compound WX011-3 (0.3 g, 2.08 mmol) was dissolved in acetic acid (1.5 mL) and then dichloromethane (1.5 mL) was added thereto. The system was cooled to 0° C. and N-iodosuccinimide (468 mg, 2.08 mmol) was added thereto. The resulting reaction mixture was stirred continuously for 2 hours. The reaction mixture was added with water (10 mL) and extracted with dichloromethane (10 mL×2). The organic phases were combined and concentrated under reduced pressure to obtain a crude product. The crude product was purified by column chromatography (0 to 30% ethyl acetate in petroleum ether) to obtain compound WX011-4. MS m/z (ESI): 270.9 [M+H]⁺. ¹H NMR (400 MHz, CDCl₃) δ=7.52 (d, J=8.4 Hz, 1H), 6.44 (t, J=54.0 Hz, 1H), 6.11 (d, J=7.6 Hz, 1H), 4.51 (s, 2H).

Step 4: Synthesis of Compound WX011

Compound WX011-4 (120 mg, 444.41 μmol) and compound WX004-2 (119 mg, 533.30 μmol) were dissolved in THF (5 mL), and then triethylamine (360 mg, 3.56 mmol), cuprous iodide (13 μmg, 66.66 μmol), and 2-dicyclohexylphosphino-2,4,6-triisopropylbiphenyl (32 mg, 66.66 μmol) were added thereto. After the reaction system was replaced with nitrogen, bis(acetonitrile)dichloropalladium (12 mg, 44.44 μmol) was added thereto. The reaction system was replaced with nitrogen again, and the reaction mixture was stirred at 40° C. for 16 hours. The reaction mixture was concentrated under reduced pressure to obtain a crude product. The crude product was purified by column chromatography (0 to 50% ethyl acetate in petroleum ether) to obtain compound WX011. MS m/z (ESI): 365.9 [M+H]⁺. ¹H NMR (400 MHz, CDCl₃) δ=8.20 (d, J=4.0 Hz, 1H), 7.64-7.55 (m, 2H), 7.50-7.46 (m, 2H), 7.44-7.40 (m, 2H), 7.05-6.78 (m, 3H), 6.56 (d, J=8.4 Hz, 1H), 5.40 (s, 2H), 4.81 (s, 2H), 3.88 (s, 2H).

Example 12

Synthetic Route:

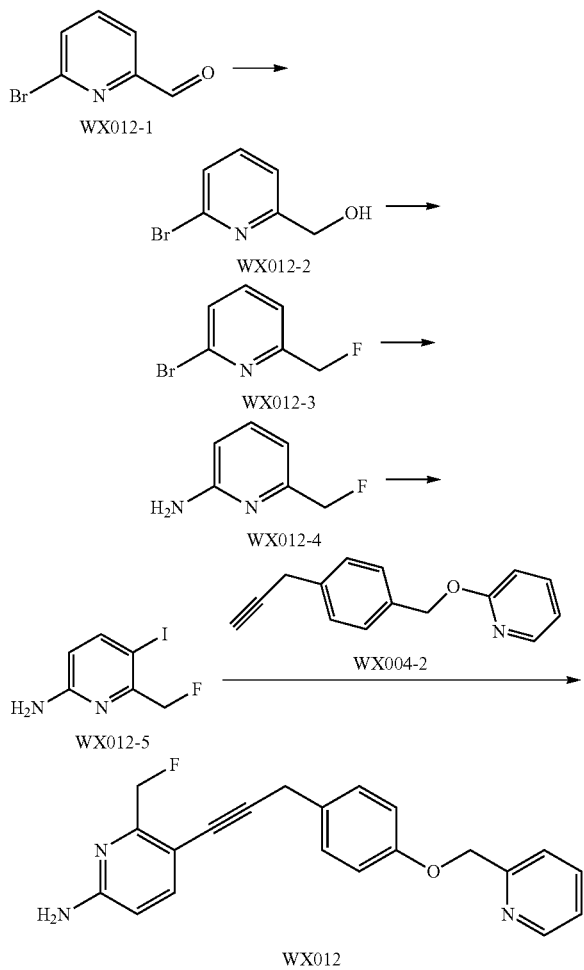

Step 1: Synthesis of Compound WX012-2

Compound WX012-1 (CAS: 34160-40-2, 2.6 g, 13.98 mmol) was dissolved in methanol (40 mL), and sodium borohydride (529 mg, 13.98 mmol) was added thereto, then the reaction mixture was stirred at 20° C. for 0.5 hours. The reaction mixture was added with water (50 mL) and extracted with ethyl acetate (50 mL×2). The organic phases were combined and washed with saturated sodium chloride aqueous solution (100 mL), then dried over anhydrous sodium sulfate. The resulting mixture was filtered and concentrated under reduced pressure to obtain compound WX012-2. ¹H NMR (400 MHz, CDCl₃) δ=7.58-7.53 (m, 1H), 7.38 (d, J=7.6 Hz, 1H), 7.31 (d, J=7.6 Hz, 1H), 4.75 (s, 2H).

Step 2: Synthesis of Compound WX012-3

Compound WX012-2 (2.55 g, 13.56 mmol) was dissolved in dichloromethane (40 mL) under nitrogen atmosphere at −78° C. To a solution of diethylaminosulfur trifluoride (6.56 g, 40.69 mmol, 5.38 mL) in dichloromethane (65 mL) was slowly added the resulting mixture. The resulting reaction mixture was stirred continuously for 1 hour, and then warmed up to 20° C. and stirred for 15 hours. The reaction mixture was poured into ice water (200 mL) with stirring and extracted with dichloromethane (50 mL×2). The organic phases were combined, washed with saturated sodium chloride aqueous solution (100 mL), dried over anhydrous sodium sulfate, filtered and concentrated under reduced pressure. The residue was separated by automatic column chromatography machine COMBI-FLASH (eluent:petroleum ether:ethyl acetate=100:0 to 2:1) to obtain compound WX012-3. ¹HNMR (400 MHz, CDCl₃) δ=7.67-7.61 (m, 1H), 7.46-7.43 (m, 2H), 5.46 (d, J=46.4 Hz, 2H).

Step 3: Synthesis of Compound WX012-4

To ethylene glycol (20 mL) was added compound WX012-3 (2 g, 10.53 μmmol), ammonia water (15.81 g, 126.31 mmol, 17.37 mL, content of 28%), and potassium carbonate (291 mg, 2.11 mmol). Cuprous oxide (75 mg, 526.28 μmol) and dimethylethylenediamine (93 mg, 1.05 mmol, 114.97 μL) were added dropwise thereto with stirring, and the resulting reaction mixture was stirred at 130° C. for 12 hours. After cooling to room temperature, the reaction mixture was added with water (50 mL) and extracted with ethyl acetate (50 mL×2). The organic phases were combined and washed with saturated sodium chloride aqueous solution (50 mL), then dried over anhydrous sodium sulfate, filtered, and concentrated under reduced pressure. The residue was purified by automatic column chromatography machine COMBI-FLASH (eluent:petroleum ether:ethyl acetate=100:0 to 2:1) to obtain compound WX012-4. ¹H NMR (400 MHz, CDCl₃) δ=7.41-7.37 (m, 1H), 6.69 (d, J=7.2 Hz, 1H), 6.37 (d, J=8.0 Hz, 1H), 5.22 (d, J=47.2 Hz, 2H), 4.49 (s, 2H).

Step 4: Synthesis of Compound WX012-5

Compound WX012-4 (210 mg, 1.66 mmol) was dissolved in dichloromethane (1 mL) and glacial acetic acid (1 mL), and N-iodosuccinimide (374 mg, 1.66 mmol) was added thereto. The reaction was stirred at 20° C. for 1 hour. The reaction mixture was added with dichloromethane (10 mL), washed with saturated sodium sulfite aqueous solution (20 mL×2) and saturated sodium chloride aqueous solution (20 mL), dried over anhydrous sodium sulfate, filtered and concentrated under reduced pressure. The residue was purified by automatic column chromatography machine COMBI-FLASH (eluent:petroleum ether:ethyl acetate=100:0 to 2:1) to obtain compound WX012-5. MS m/z (ESI): 252.8 [M+H]$^+$. $^1$H NMR (400 MHz, CDCl$_3$) δ=7.68 (d, J 8.8 Hz, 1H), 6.21 (d, J=8.4 Hz, 1H), 5.32 (d, J=47.2 Hz, 2H), 4.68 (s, 2H).

Step 5: Synthesis of Compound WX012

To DMF (2 mL) was added compounds WX012-5 (100 mg, 396.78 μmol), WX004-2 (133 mg, 595.17 μmol), N,N-diisopropylethylamine (205 mg, 1.59 mmol, 276 μL), cuprous iodide (7 mg, 39.68 μmol), and bis(triphenylphosphine)palladium(II) chloride (14 mg, 19.84 μmol, 0.05 eq). The reaction system was replaced with nitrogen three times and the reaction mixture was stirred at 30° C. for 2 hours. The reaction mixture was added with ethyl acetate (10 mL), washed with water (10 mL×2) and saturated sodium chloride aqueous solution (20 mL), dried over anhydrous sodium sulfate, filtered, and concentrated under reduced pressure. The residue was purified by automatic column chromatography machine COMBI-FLASH (petroleum ether:ethyl acetate=100:0 to 2:1) to obtain compound WX012. MS m/z (ESI): 347.9 [M+H]$^+$. $^1$HNMR (400 MHz, DMSO-d$_6$) δ=8.19-8.18 (m, 1H), 7.75-7.70 (m, 1H), 7.48-7.39 (m, 5H), 7.01-6.98 (m, 1H), 6.87 (d, J=8.0 Hz, 1H), 6.46-6.45 (m, 3H), 5.34 (s, 2H), 5.32 (d, J=47.6 Hz, 2H), 3.90 (s, 2H).

Example 13

Synthetic Route:

To a reaction flask was added NaI (3.18 g, 21.25 mmol), then added compound WX004 (6.7 g, 21.25 mmol). After the reaction system was replaced with nitrogen, anhydrous THF (70 mL) and WX013-1 (16.49 g, 63.74 mmol) were added thereto. The resulting reaction mixture was stirred at 25° C. for 16 hours. The reaction mixture was added with ethyl acetate (50 mL) and washed with saturated sodium bicarbonate solution (30 mL×2), and the organic phase was concentrated under reduced pressure to obtain the crude product of WX013-2. The crude product of WX013-2 (10 g, 18.60 mmol) was dissolved in DCM (100 mL) and the system was cooled to 0° C. TFA (25 mL, 337.65 mmol) was added thereto and the resulting reaction mixture was stirred at 25° C. for 1 hour. The reaction mixture was concentrated under reduced pressure to obtain a crude product. Water (20 mL) was added thereto and the pH was adjusted to 7 to 8 with ammonia water, and the mixture was washed with ethyl acetate (30 mL×3). The aqueous phase was purified by a column chromatography machine (reverse phase C18 column, 40 g, eluent: acetonitrile/water (0.1% ammonia water), gradient: 0 to 20%). The resulting fraction was concentrated under reduced pressure to remove acetonitrile and added with a small amount of formic acid to obtain WX013. MS m/z (ESI): 426.1 [M+H]$^+$. $^1$H NMR (400 MHz, DMSO-d$_6$) δ=8.14-8.10 (m, 2H), 7.80-7.76 (m, 2H), 7.46-7.40 (m, 4H), 7.09-7.01 (m, 2H), 6.90 (d, J=8.4 Hz, 1H), 5.64 (d, J=8.0 Hz, 2H), 5.29 (s, 2H), 3.84 (s, 2H).

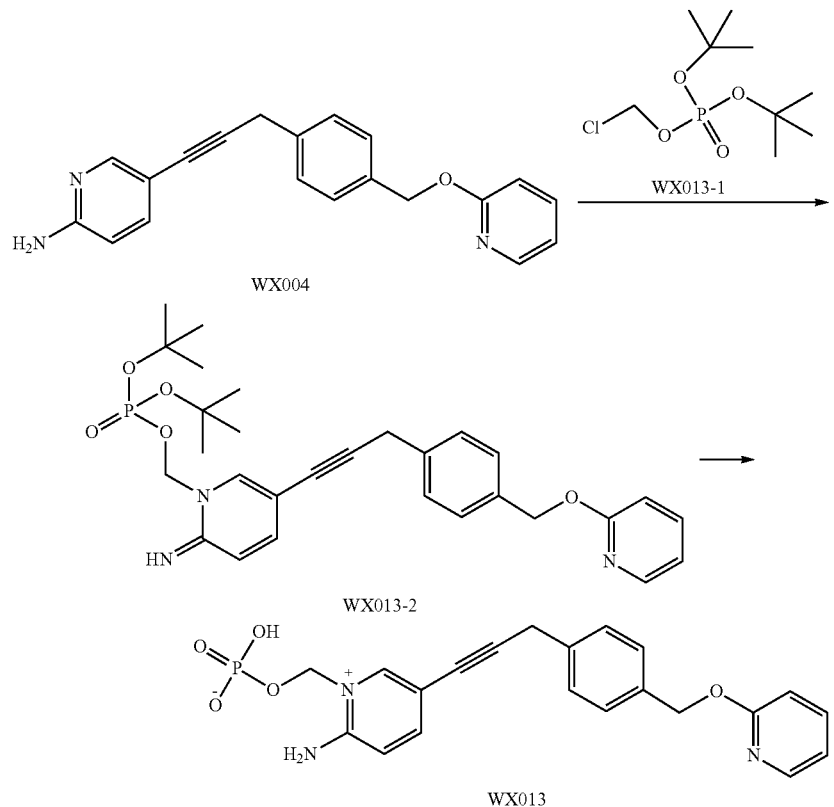

Test Example 1. Minimum Inhibitory Activity Test of Antifungal Drugs

1. Experimental Purpose

To test the minimum inhibitory concentration (MIC) and minimum effective concentration (MEC) of the drug against fungi.

2. Experimental Strains and Test Media

Experimental strains: *Candida parapsilosis* ATCC 22019; *Candida albicans* ATCC MYA-2876; *Candida albicans* WX-CA009; *Candida glabrata* ATCC15126; *Candida tropicalis* ATCC 750;
*Cryptococcus neoformans* H99 ATCC 208821;
*Aspergillus fumigatus* ATCC-MYA-4609; *Aspergillus flavus* ATCC MYA-1004
Test medium: RPMI1640 (containing 0.165 M MOPS, pH7.0)

3. Experimental Procedure 3.1 Preparation of Compound Stock Plate

On the day of the experiment, the compound in the bottle was dissolved in 100% DMSO to a stock solution concentration of 6.24 mg/mL. Then, the mixture was 10-fold diluted with DMSO to 0.624 mg/mL for use.

A 2-fold gradient dilution of the compound solution (0.624 mg/mL) was performed using DMSO on a 96-microwell plate (V-bottom) to obtain 100× working solutions (wells 1 to 11). 624, 312, 156, 78, 39, 20, 10, 5, 2.5, 1.25, 0.625 μg/mL. 100% DMSO was used as a positive control (well 12). This was the compound stock plate.

3.2 Preparation of Inoculum

*Candida parapsilosis* ATCC 22019 and *Candida albicans* ATCC MYA-2876; *Candida albicans* WX-CA009; *Candida glabrata* ATCC15126; *Candida tropicalis* ATCC 750 frozen at −80° C. were streaked on SDA plates and incubated aerobically in a 35±2° C. incubator for 24 hours.

*Cryptococcus neoformans* H99 ATCC 208821 frozen at −80° C. was streaked on SDA plates and incubated aerobically in a 35±2° C. incubator for 48 hours.

*Aspergillus fumigatus* ATCC-MYA-4609; *Aspergillus flavus* ATCC MYA-1004 frozen at −80° C. were streaked on SDA plates and incubated aerobically in a 30±2° C. incubator for 6 days.

On the day of the experiment, for strains *Candida parapsilosis* ATCC 22019, *Candida albicans* ATCC MYA-2876; *Candida albicans* WX-CA009; *Candida glabrata* ATCC15126; *Candida tropicalis* ATCC 750 and *Cryptococcus neoformans* H99 ATCC 208821, the plates were taken out and the clones on the plates were picked, suspended in normal saline, and then the turbidity of the fungal suspension was adjusted to OD600=0.2 using a turbidimeter. The fungal suspension contained about $3.0 \times 10^6$ CFU/mL. Then the turbidity-adjusted fungal suspension was diluted with a test medium to a concentration of about $3.0 \times 10^3$ CFU/mL. This was the inoculum.

For strains *Aspergillus fumigatus* ATCC MYA-4609; *Aspergillus flavus* ATCC MYA-1004, after taking out the plate, 3 mL of 0.9% normal saline containing 0.1% Tween20 was added to the plate and the spores were gently collected. The spores were counted with a hemocytometer and the spore suspension was adjusted to about $5 \times 10^6$ spores/mL. Then the spore suspension was diluted to 0.8 to $1 \times 10^5$ spores/mL with a test medium.

3.3 MIC and MEC Detection

2 μL of 100× working solution from the compound stock plate (prepared in 3.1) was transferred to a round-bottomed 96-well plate (containing 98 μL of test medium), and then 100 μL of fungus inoculum (prepared in 3.2) was added to each well to obtain a MIC test plate. Therefore, the final test concentrations of the compounds were 6.24, 3.12, 1.56, 0.78, 0.39, 0.20, 0.10, 0.05, 0.025, 0.0125, 0.006 μg/mL. 1% DMSO was used as a growth control.

For strains *Candida parapsilosis* ATCC 22019; *Candida albicans* ATCC MYA-2876; *Candida albicans* WX-CA009; *Candida glabrata* ATCC15126; *Candida tropicalis* ATCC 750, all test plates were incubated aerobically in a 35±2° C. incubator for 24 hours.

For mold strains *Aspergillus fumigatus* ATCC-MYA-4609 and *Aspergillus flavus* ATCC MYA-1004, all test plates were incubated aerobically in a 35±° C. incubator for 48 hours.

For *Cryptococcus neoformans* H99 ATCC 208821, all test plates were incubated aerobically in a 35±2° C. incubator for 72 hours.

3.4 Reading MIC and MEC

After incubation, according to the criteria in Table 1 below, the test plate was observed by eye or microscope to determine the MIC (g/mL) and MEC (g/mL) of the test compound against yeast and mold.

TABLE 1

| MIC/MEC judgment criteria of test compounds against fungi | |
|---|---|
| Strain | MIC/MEC Judgment Criteria |
| Candida albicans | Observed by eye, ≥50% growth inhibition (compared to growth well), read MIC. |
| Candida parapsilosis | |
| Candida tropicalis | |
| Candida glabrata | |
| Cryptococcus neoformans | |
| Aspergillus fumigatus | Observed by microscope, compared to the morphology of hyphae in the growth well, if the morphology of hyphae changed, read MEC. |
| Aspergillus flavus | |

4. Experimental Results

TABLE 2

Results of inhibitory test

| | | Test sample | | | | | | | | | |
|---|---|---|---|---|---|---|---|---|---|---|---|
| Strain | Test | WX003 | WX004 | WX005 | WX006 | WX007 | WX008 | WX009 | WX010 | WX011 | WX012 |
| ATCC 22019 | 1st time | 0.025 | 0.05 | 0.1 | 0.05 | 0.1 | 0.05 | 0.05 | 0.1 | 0.39 | 0.05 |
| | 2nd time | 0.025 | 0.05 | 0.2 | 0.05 | / | / | / | / | / | / |

TABLE 2-continued

Results of inhibitory test

| Strain | Test | WX003 | WX004 | WX005 | WX006 | WX007 | WX008 | WX009 | WX010 | WX011 | WX012 |
|---|---|---|---|---|---|---|---|---|---|---|---|
| | 3rd time | 0.025 | 0.05 | 0.2 | 0.05 | / | / | / | / | / | / |
| ATCC MYA-2876 | 1st time | 0.025 | 0.0125 | 0.05 | 0.025 | 0.1 | 0.05 | 0.05 | 0.05 | 0.2 | 0.05 |
| | 2nd time | ≤0.006 | <0.006 | 0.05 | 0.0125 | / | / | / | / | / | / |
| | 3rd time | ≤0.006 | 0.025 | 0.1 | 0.0125 | / | / | / | / | / | / |
| WX-CA009 | 1st time | 0.0125 | 0.025 | 0.1 | 0.05 | 0.05 | 0.05 | 0.05 | 0.05 | 0.2 | 0.05 |
| | 2nd time | 0.025 | 0.025 | 0.05 | 0.025 | / | / | / | / | / | / |
| | 3rd time | 0.025 | 0.025 | 0.1 | 0.025 | / | / | / | / | / | / |
| ATCC 750 | 1st time | 0.0125 | ≤0.006 | 0.0125 | 0.0125 | 0.05 | 0.05 | 0.1 | 0.05 | 0.2 | 0.05 |
| | 2nd time | 0.0125 | 0.025 | 0.05 | 0.025 | / | / | / | / | / | / |
| | 3rd time | 0.0125 | 0.025 | 0.05 | 0.025 | / | / | / | / | / | / |
| ATCC 15126 | 1st time | 0.39 | 0.39 | 1.56 | 0.39 | 0.78 | 0.78 | 0.78 | 0.78 | 1.56 | 0.78 |
| | 2nd time | 0.78 | 0.78 | 1.56 | 0.39 | / | / | / | / | / | / |
| | 3rd time | 0.39 | 0.78 | 1.56 | 0.39 | / | / | / | / | / | / |
| ATCC 208821 | 1st time | 0.39 | 1.56 | >6.24 | 0.78 | 1.56 | 3.12 | 0.025 | 1.56 | >6.24 | 1.56 |
| | 2nd time | 0.39 | 1.56 | 6.24 | 0.78 | / | / | / | / | / | / |
| | 3rd time | 0.39 | 1.56 | 6.24 | 0.78 | / | / | / | / | / | / |
| ATCC MYA-1004 | 1st time | 0.2 | 0.39 | 3.12 | 0.39 | 0.39 | 0.39 | 0.39 | 0.1 | 0.39 | 0.2 |
| | 2nd time | 0.39 | 0.78 | 3.12 | 0.39 | / | / | / | / | / | / |
| | 3rd time | 0.39 | 0.39 | 3.12 | 0.2 | / | / | / | / | / | / |
| ATCC MYA-4609 | 1st time | 0.1 | 0.1 | 0.39 | 0.1 | 0.39 | 1.56 | 0.39 | 0.1 | 0.2 | 0.1 |
| | 2nd time | 0.2 | 0.1 | 0.39 | 0.1 | / | / | / | / | / | / |
| | 3rd time | 0.2 | 0.1 | 0.2 | 0.05 | / | / | / | / | / | / |

Note:
The experimental results are the results of three independent experiments, with the unit of μg/mL.

Conclusion: The compounds of the present disclosure have good inhibitory activity against *Candida*, *Cryptococcus*, and *Aspergillus*.

Test Example 2: Mouse Pharmacokinetic Evaluation Experiment

Experimental Purpose: Using female CD-1 mice as test animals, LC/MS/MS was used to measure the plasma drug concentration at different times after intraperitoneal injection of the test compound. To study the pharmacokinetic behavior of the test compound in mice and evaluate its pharmacokinetic characteristics.

Drug preparation: An appropriate amount of sample was weighed and then prepared into a clear or suspended solution.

Administration scheme: Two healthy female CD-1 mice were taken, purchased from Beijing Vital River Laboratory Animal Technology Co., Ltd., and given a normal diet. The drug was administered through intraperitoneal injection.

Operational steps: 2 hours before administration, 1-aminobenzotriazole (ABT) was orally administered (50 mg/kg, 5 mg/mL in normal saline), and after animal administration, about 30 μL of blood was collected at 0.083, 0.25, 0.5, 1, 2, 4, 8, and 24 hours, and placed in commercially available anticoagulant tubes pre-added with EDTA-K2. The tubes were centrifuged for 10 minutes to separate the plasma, and the plasma was stored at −60° C. The content of the target compound in the plasma sample was determined by LC/MS/MS method, and the experimental results are shown in Table 3.

TABLE 3

Results of pharmacokinetic experiments in mice

| Test Sample | Dose (mpk) | Peak Concentration $C_{max}$ (μM) | Peak Time $T_{max}$ (h) | Concentration Integral AUC (μM · h) |
|---|---|---|---|---|
| WX003 | 26 | 13.5 | 0.5 | 27 |
| WX004 | 26 | 19 | 1 | 305 |
| WX006 | 26 | 23 | 1.5 | 221 |
| WX007 | 6 | 4.7 | 1.5 | 64 |

TABLE 3-continued

Results of pharmacokinetic experiments in mice

| Test Sample | Dose (mpk) | Peak Concentration $C_{max}$ (μM) | Peak Time $T_{max}$ (h) | Concentration Integral AUC (μM · h) |
|---|---|---|---|---|
| WX008 | 6 | 4.7 | 4.3 | 75 |
| WX009 | 6 | 11.4 | 0.75 | 67 |
| WX010 | 6 | 7.9 | 1 | 51 |

Conclusion: The compounds show high exposure when used in combination with ABT in mice.

Test Example 3: Pharmacokinetic Evaluation Experiment in Rats, Dogs, and Monkeys Experimental Purpose: To evaluate the druggability of the compounds by measuring its pharmacokinetic properties in different animal species.

Experimental materials: CD-1 mice, Sprague-Dawley strain rats, beagle dogs, and crab-eating macaques.

Drug preparation: An appropriate amount of sample was weighed and then prepared into a clear or suspended solution.

Experimental procedure: The animal pharmacokinetic characteristics after intravenous injection and oral administration of the compound were tested using a standard protocol. The candidate compound was prepared as a clear solution (for intravenous injection) or a homogeneous suspension (for oral administration) during the experiment and administered to the animals as a single dose. Whole blood samples were collected at 0.083, 0.25, 0.5, 1, 2, 4, 8, and 24 hours, centrifuged at 3200 g for 10 minutes to separate the supernatant to obtain plasma samples. The plasma concentration was quantitatively analyzed by LC-MS/MS analysis method and pharmacokinetic parameters were calculated, such as peak concentration, peak time, clearance rate, half-life, area under the drug-time curve, etc.

Conclusion: The pharmacokinetic properties of the compounds of the present disclosure are good and meet the requirements for drug development.

Test Example 4: Mouse Candidemia Efficacy Model

Experimental animals: female CD-1 mice, 7 weeks old, 27 to 29 g, n=5 or 8;
microbial pathogen: *Candida albicans* ATCC MYA-2876;
inoculation level and route: 2.0 to 4.0E+05 CFU/mouse, infected by tail vein injection;
treatment: The treatment started at 1 hour after infection. Firstly, ABT was administered orally, and 2 hours later, the test compound was injected intraperitoneally once a day for 7 days in total, with an administration volume of 10 mL/kg.

Observation indicators: Changes in body weight and mortality within 7 days after infection in each group of mice.

Conclusion: After CD-1 mice were injected with a certain dose of *Candida albicans* ATCC MYA-2876 via the tail vein, the mortality rate of animals reached 100% within 7 days, causing severe mouse candidemia. In this model, after animals were given 50 mg/kg ABT orally first, the test compounds WX004, WX006, and WX009 at a low dose of 26 mg/kg (n=5) could completely protect mice infected with *Candida albicans* ATCC MYA-2876 from death caused by candidemia. In addition, at a dose of 6 mpk, the survival rate of WX004 was also 100% (n=8).

Test Example 5: Efficacy Study of Mouse *Candida* Vaginal Infection Model

Experimental animals: female C3H/NeH mice, 6 to 8 weeks old, 19 to 21 g, n=5 to 6;
microbial pathogen: *Candida albicans* ATCC MYA-4788;
inoculation level and route: 5.0E+05 CFU/mouse, infected by vaginal instillation;
test sample: WX004: 20 mpk

TABLE 4

Pharmacokinetic parameters of the compounds of the present disclosure measured in various species

| | Compound No. | | | | | Compound No. | | | | | |
|---|---|---|---|---|---|---|---|---|---|---|---|
| | WX004 Route of Administration | | | | | WX004 Route of Administration | | | WX013 | | |
| | IV Species | | | | | PO Species | | | PO* | | |
| | Mouse | Rat | Dog | Monkey | | Rat | Dog | Monkey | Rat | Dog | Monkey |
| Dose (mpk) | 1 | 3 | 1 | 0.4 | Dose (mpk) | 30 | 10 | 10 | 1000 | 4 | 13.5 |
| CL (mL/Kg/min) | 28 | 7 | 21 | 4.3 | Cmax (μM) | 10 | 6.5 | 9 | 64 | 2 | 16 |
| Vd (L/Kg) | 5.2 | 1.8 | 2.8 | 4.4 | Tmax (nM) | 1.5 | 0.75 | 4 | 48 | 0.5 | 3 |
| AUC (μM · h) | 2.0 | 22 | 2.8 | 5.0 | AUC (μM · h) | 95 | 14 | 72 | 2528 | 4 | 111 |
| $T_{1/2}$ (h) | 2.1 | 4 | 2.5 | 3.5 | F % | 45% | 51% | 60% | 46% | 48% | 89% |

*In oral administration experiments, the concentration of the parent drug was detected.

Experimental results: As shown in Table 4, after testing, WX013 was completely decomposed into the parent drug WX004 in rat, dog, and monkey plasma within 0.5 hours.

Treatment: ABT was administered orally 22 hours after infection, and the test compound was injected intraperitoneally 24 hours after infection. In this experiment, the Vehicle group and the test compound group were set up, with a total of 3 days of administration, once a day, and a administration volume of 10 mL/kg.

Observation indicators: After 96 hours of infection in each group of mice, the vaginal tissue and vaginal lavage fluid of the mice were taken for CFU counting. Plasma samples were collected at 0.25 h, 0.5 h, 1 h, 2 h, 4 h, 8 h, and 24 h after the last administration.

Conclusion: After mice were instilled with a certain dose of *Candida albicans* ATCC MYA-4788 via the vagina, a stable vaginal infection model could be established. The fungal load in the vaginal tissue and vaginal lavage fluid of the Vehicle group was 4.8±0.08 lg and 3.7±0.15 lg, respectively. Compared with the Vehicle group, the fungal load in the vaginal tissue fluid and vaginal lavage fluid of the test compound WX004 at a dose of 20 mpk was significantly reduced by 2.7 lg and 2.5 lg, respectively (P<0.001).

What is claimed is:

1. A compound of formula (P) or a pharmaceutically acceptable salt thereof,

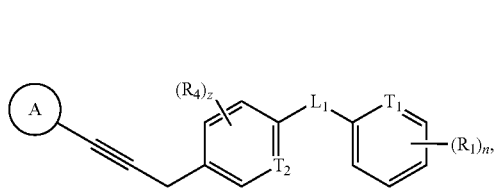

wherein,

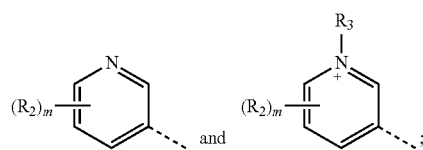

ring A is selected from $T_1$ and $T_2$ are selected from CH and N;

$L_1$ is selected from —O—, —CH$_2$O— and —OCH$_2$—, and the —CH$_2$O— and —OCH$_2$ are optionally substituted by 1 or 2 halogens;

each $R_1$ is independently selected from H, F, Cl, Br, I, OH, and NH$_2$;

each $R_2$ is independently selected from F, Cl, OH, NH$_2$, and $C_{1-3}$ alkyl, and the $C_{1-3}$ alkyl is optionally substituted by 1, 2, or 3 $R_a$;

$R_3$ is selected from

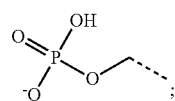

each $R_4$ is independently selected from H, F, Cl, Br, and I;

each $R_a$ is independently selected from F, Cl, Br, and I;

m is selected from 1, 2, 3, and 4;

n is selected from 1, 2, 3, and 4;

z is selected from 1, 2, and 3.

2. The compound or the pharmaceutically acceptable salt thereof according to claim 1, wherein Li is selected from —O—, —CH$_2$O—, and —OCH$_2$—.

3. The compound or the pharmaceutically acceptable salt thereof according to claim 1, wherein Tis selected from N.

4. The compound or the pharmaceutically acceptable salt thereof according to claim 1, wherein $T_2$ is selected from CH.

5. The compound or the pharmaceutically acceptable salt thereof according to claim 1, wherein each $R_1$ is independently selected from H and F.

6. The compound or the pharmaceutically acceptable salt thereof according to claim 1, wherein the structural moiety

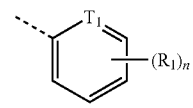

is selected from

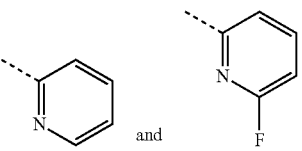

7. The compound or the pharmaceutically acceptable salt thereof according to claim 1, wherein each $R_2$ is independently selected from F, Cl, OH, NH$_2$, CH$_3$, CH$_2$CH$_3$, and CH(CH$_3$)$_2$, and the CH$_3$, CH$_2$CH$_3$, and CH (CH$_3$)$_2$ are optionally substituted by 1, 2, or 3 $R_a$.

8. The compound or the pharmaceutically acceptable salt thereof according to claim 7, wherein each $R_2$ is independently selected from F, Cl, OH, NH$_2$, CH$_3$, CHF$_2$, and CH$_2$F.

9. The compound or the pharmaceutically acceptable salt thereof according to claim 1, wherein the structural moiety

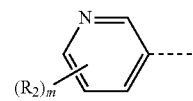

is selected from

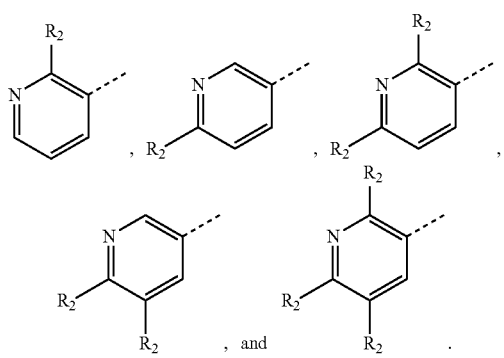

10. The compound or the pharmaceutically acceptable salt thereof according to claim 1, wherein ring A is selected from

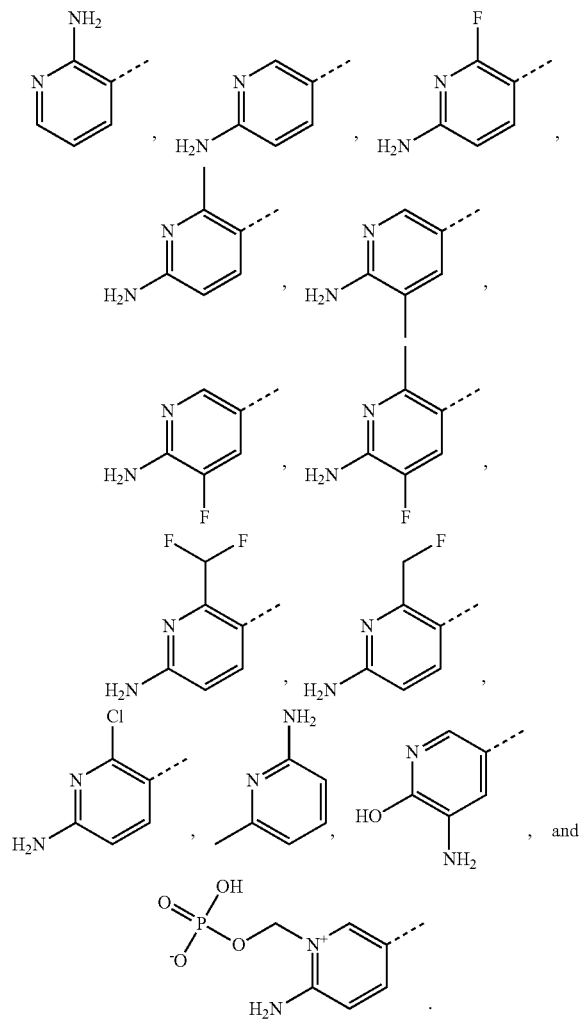

11. The compound or the pharmaceutically acceptable salt thereof according to claim 1, wherein each $R_4$ is independently selected from H and F.

12. The compound or the pharmaceutically acceptable salt thereof according to claim 1, wherein the structural moiety

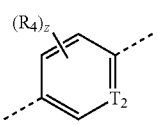

is selected from

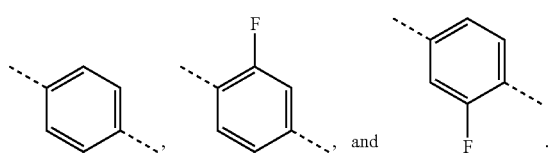

13. The compound or the pharmaceutically acceptable salt thereof according to claim 1, selected from

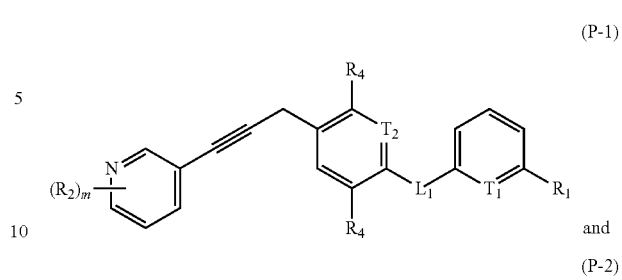

and

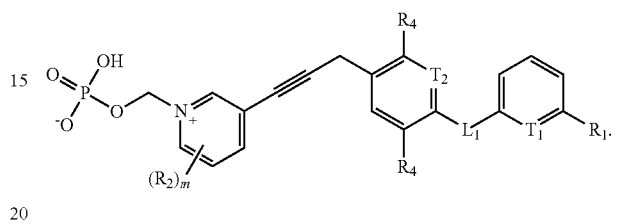

14. A compound as shown below or a pharmaceutically acceptable salt thereof, selected from

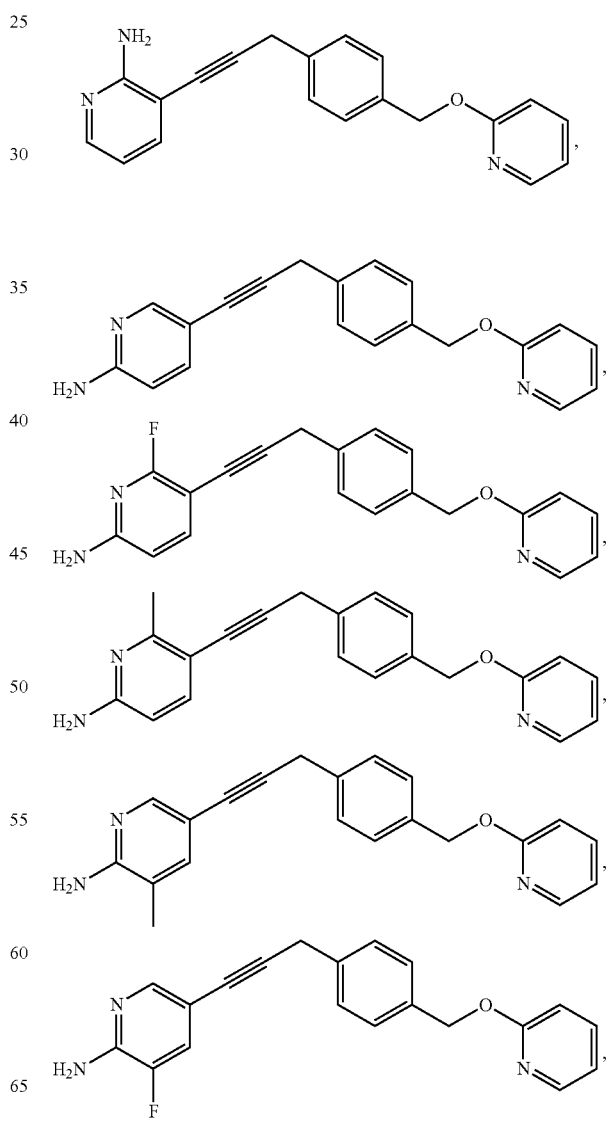

-continued

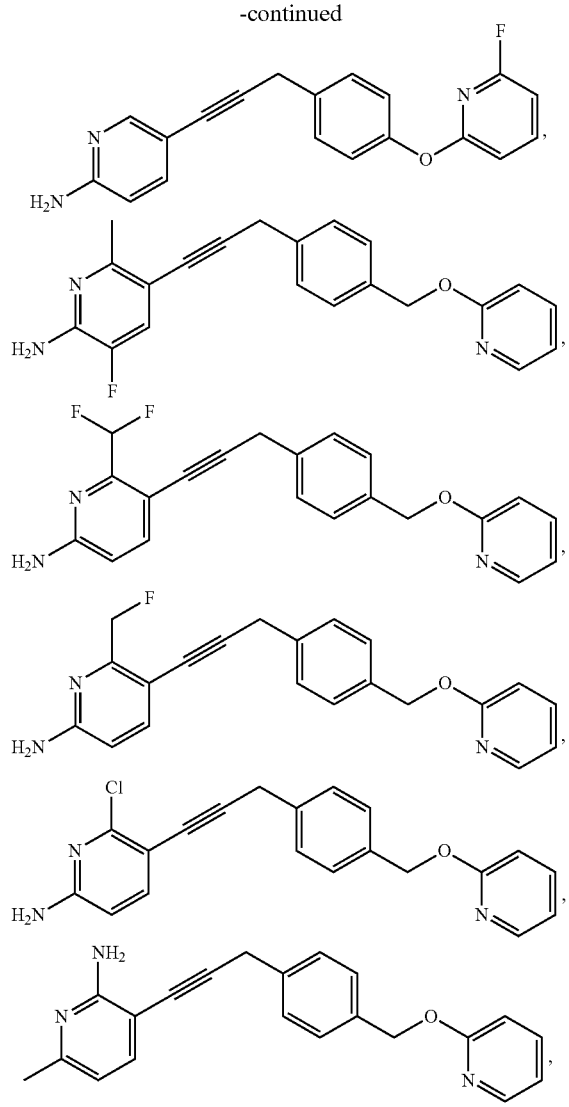

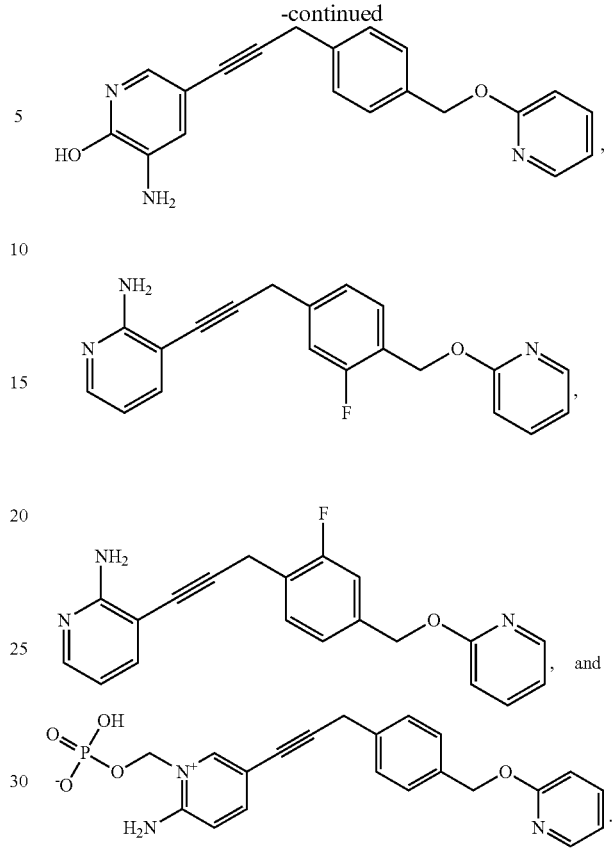

15. A method for treating fungal infections in a subject in need thereof, comprising: administering the compound or the pharmaceutically acceptable salt thereof according to claim 1 to the subject.

16. A method for treating fungal infections in a subject in need thereof, comprising: administering the compound or the pharmaceutically acceptable salt thereof according to claim 14 to the subject.

* * * * *